(12) United States Patent
Tamura et al.

(10) Patent No.: US 10,753,828 B2
(45) Date of Patent: Aug. 25, 2020

(54) TIRE MANAGEMENT DEVICE AND TIRE MANAGEMENT PROGRAM

(71) Applicant: BRIDGESTONE CORPORATION, Tokyo (JP)

(72) Inventors: Daisuke Tamura, Tokyo (JP); Keiichi Sakai, Tokyo (JP); Shinichiro Yamazaki, Tokyo (JP); Seita Komori, Tokyo (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 88 days.

(21) Appl. No.: 16/308,313

(22) PCT Filed: Apr. 3, 2017

(86) PCT No.: PCT/JP2017/013948
§ 371 (c)(1),
(2) Date: Dec. 7, 2018

(87) PCT Pub. No.: WO2017/212756
PCT Pub. Date: Dec. 14, 2017

(65) Prior Publication Data
US 2019/0265129 A1    Aug. 29, 2019

(30) Foreign Application Priority Data
Jun. 9, 2016 (JP) ................................ 2016-115730

(51) Int. Cl.
*G01M 17/02* (2006.01)
*B60C 11/24* (2006.01)
(Continued)

(52) U.S. Cl.
CPC ........... *G01M 17/02* (2013.01); *B60C 11/246* (2013.01); *B60C 19/00* (2013.01); *B60C 23/04* (2013.01)

(58) Field of Classification Search
CPC .. G01M 17/02; G01M 17/021; G01M 17/022; G01M 17/027; G01M 17/025;
(Continued)

(56) References Cited

U.S. PATENT DOCUMENTS 3,563,088 A * 2/1971 Sperberg ............ B29D 30/0633
73/146
6,269,690 B1 * 8/2001 Shimizu ................. B60C 11/24
73/146
(Continued)

FOREIGN PATENT DOCUMENTS

CN   101535998 A   9/2009
CN   101984333 A   3/2011
(Continued)

OTHER PUBLICATIONS

International Preliminary Report on Patentability with the translation of Written Opinion dated Dec. 20, 2018 issued by the International Bureau in No. PCT/JP2017/013948.
(Continued)

*Primary Examiner* — Andre J Allen
(74) *Attorney, Agent, or Firm* — Sughrue Mion, PLLC

(57) ABSTRACT

This tire management device enables tire management for equalizing the use period of tires mounted on a vehicle, and is provided with a deterioration state prediction unit which, for each mounting position, predicts the deterioration tendency and the deterioration state of the tires mounted on the vehicle; a usable period prediction unit which, for each tire mounting position, predicts the usable period of the tire on the basis of the deterioration tendency and deterioration state predicted by the deterioration state prediction unit; and a mounting position planning unit which, setting the deterioration tendency of each tire predicted by the deterioration state prediction unit as a mounting position deterioration characteristic of each mounting position of a tire in the
(Continued)

vehicle, creates, on the basis of said mounting position deterioration characteristics and the usable periods of the tires predicted by the usable period prediction unit, a modification proposal for changing the mounting positions of the tires on the vehicle in order to equalize the use period of each tire.

6 Claims, 11 Drawing Sheets

(51) Int. Cl.
*B60C 23/04* (2006.01)
*B60C 19/00* (2006.01)

(58) Field of Classification Search
CPC ...... G01M 17/024; G01M 17/10; G01M 7/08; G01M 17/0076; G01M 17/013; G01M 17/03; G01M 17/04; G01M 17/06; G01M 17/08; G01M 1/02; G01M 1/045; G01M 1/12; G01M 1/225; G01M 3/04; G01M 3/40; G01M 5/0091; G01M 7/02; G01M 99/00; G01M 99/002; B60C 23/0494; B60C 2019/004; B60C 23/0493; B60C 23/064; B60C 19/00; B60C 23/04; B60C 23/0488; B60C 23/0498; B60C 23/0496; B60C 23/0408; B60C 23/041; B60C 23/0411; B60C 23/20; B60C 11/246; B60C 23/0486; B60C 23/06; B60C 23/061; B60C 11/243; B60C 99/00; B60C 11/0083; B60C 13/003; B60C 2009/2038; B60C 23/004; B60C 23/02; B60C 23/0401; B60C 23/0406; B60C 23/0416; B60C 23/0433; B60C 23/0455; B60C 23/0459; B60C 23/0474; B60C 23/0489; B60C 23/0491; B60C 25/002; B60C 25/005; B60C 25/007; B60C 29/02; B60C 3/04; B60C 99/006; B60C 11/0332; B60C 11/24; B60C 13/001; B60C 13/02; B60C 15/0036; B60C 17/02; B60C 2009/0071; B60C 2009/2022; B60C 2200/02; B60C 2200/06; B60C 2200/065; B60C 23/00; B60C 23/001; B60C 23/003; B60C 23/007; B60C 23/008; B60C 23/0413; B60C 23/0427; B60C 23/0447; B60C 23/0454; B60C 23/0457; B60C 23/0462; B60C 23/0471; B60C 23/0472; B60C 23/0476; B60C 23/0479; B60C 23/0484; B60C 23/065; B60C 23/066; B60C 23/10; B60C 25/0548; B60C 25/056; B60C 25/132; B60C 25/138; B60C 29/005; B60C 9/005; B60C 9/18; B60C 9/1807; B60C 9/20; B60C 9/28
USPC .................................................. 73/146–146.8
See application file for complete search history.

(56) References Cited

U.S. PATENT DOCUMENTS

| | | |
|---|---|---|
| 2004/0144168 A1 | 7/2004 | Oku |
| 2009/0292515 A1 | 11/2009 | Fevrier et al. |
| 2010/0060443 A1* | 3/2010 | Wakao ............... B60C 11/246 340/444 |
| 2012/0191495 A1 | 7/2012 | McIntosh et al. |
| 2013/0262363 A1 | 10/2013 | Kimura et al. |
| 2014/0067193 A1 | 3/2014 | Gokyu et al. |
| 2014/0067599 A1 | 3/2014 | Gokyu et al. |
| 2017/0023441 A1* | 1/2017 | Luk ..................... B60C 23/04 |
| 2018/0272813 A1* | 9/2018 | Singh ................ B60C 23/0486 |
| 2019/0025113 A1* | 1/2019 | Masago ................ G01G 19/08 |
| 2019/0160886 A1* | 5/2019 | Tamura ............... B60C 19/00 |
| 2019/0255891 A1* | 8/2019 | Makke ................ G07C 5/0816 |
| 2020/0001662 A1* | 1/2020 | Storti ................ B60R 16/00 |
| 2020/0031184 A1* | 1/2020 | Ukegawa ............. G06Q 50/30 |
| 2020/0110005 A1* | 4/2020 | Williams ........... G01M 5/0033 |

FOREIGN PATENT DOCUMENTS

| | | |
|---|---|---|
| CN | 102622665 A | 8/2012 |
| EP | 0919941 A2 | 6/1999 |
| EP | 2703194 A1 | 3/2014 |
| JP | 2002-131191 A | 5/2002 |
| JP | 2002-277353 A | 9/2002 |
| JP | 2003-178219 A | 6/2003 |
| JP | 2004-145828 A | 5/2004 |
| JP | 2005047295 A | 2/2005 |
| JP | 2007-176218 A | 7/2007 |
| JP | 4177671 B2 | 11/2008 |
| JP | 2012-013640 A | 1/2012 |
| JP | 2012-126174 A | 7/2012 |
| JP | 2014-046879 A | 3/2014 |
| JP | 2014-051133 A | 3/2014 |
| WO | WO-2018168541 A1 * | 9/2018 ............. G06Q 30/00 |

OTHER PUBLICATIONS

Communication dated Mar. 8, 2019, from European Patent Office in counterpart application No. 17809939.6.
International Search Report for PCT/JP2017/013948 dated, Jul. 4, 2017 (PCT/ISA/210).
Communication dated Jan. 22, 2020, from the State Intellectual Property Office if the P.R.C in application No. 2017800357542.

* cited by examiner

TIRE MANAGEMENT DEVICE AND TIRE MANAGEMENT PROGRAM

CROSS REFERENCE TO RELATED APPLICATIONS

This application is a National Stage of International Application No. PCT/JP2017/013948 filed Apr. 3, 2017, claiming priority based on Japanese Patent Application No. 2016-115730, filed Jun. 9, 2016.

TECHNICAL FIELD

The present invention relates to a tire management device, and particularly to a tire management device and tire management program for managing tires to equalize a use period of tires mounted on a vehicle.

BACKGROUND

Conventionally, tires mounted on a vehicle are undergone so-called rotation to exchange the mounted positions every time a predetermined distance is traveled in order to prevent uneven wear of a tread rubber. And, when a tire has its tread rubber worn to some extent, it is disposed or retreaded by replacing with a new tread rubber.

It is known that the tire is deteriorated by not only the worn out of the tread rubber, but also a damage by an external factor of a tire casing (hereinafter called as casing) other than the tread rubber, a crack with a lapse of time, etc. And, since the deteriorated state of the tread rubber due to wear, a flaw or the like can be checked visually, its management is relatively easy. On the other hand, the deteriorated state of the casing is not grasped easily, and, for example, PTL 1 discloses a technology to predict the deterioration of the casing with time.

According to PTL 1, a life (service life) of the casing can be predicted to some extent, but a progress of wear of the tread rubber and that of deterioration of the casing with time are different depending on the mounted positions of tires on the vehicle, and a progress of deterioration of each tire due to wear of the tread rubber and a progress of deterioration of the casing with time do not always match. Therefore, it is not easy for the user to grasp the state of the tires including the above and to manage the tires.

CITATION LIST

Patent Literature

PTL 1: Japanese Unexamined Patent Application Publication No. 2014-46879

SUMMARY OF THE INVENTION

Technical Problem

The present invention has been achieved in view of the above problems and relates to a tire management device and a tire management program that enable tire management for equalizing the use period of tires mounted on a vehicle.

Solution to Problem

One aspect of the present invention relates to a tire management device, comprising a deterioration state prediction means which predicts a deterioration tendency and a deteriorated state of tires mounted on a vehicle for each mounting position; a usable period prediction means which predicts, on the basis of the deterioration tendency and the deteriorated state predicted by the deterioration state prediction means, a tire usable period for each mounting position; and a mounting position planning means which creates a change plan for tire mounted positions of the vehicle so as to equalize the use period of each tire by determining the deterioration tendency of each tire predicted by the deterioration state prediction means as a mounting position deterioration characteristic of each tire mounted position of the vehicle and on the basis of the mounting position deterioration characteristics and the usable period of each tire predicted by the usable period prediction means.

According to this configuration, tires can be managed to equalize the use period of the tires mounted on a vehicle. That is, it can be managed to prevent only a particular tire is deteriorated.

The invention will now be described in detail based on embodiments which do not intend to limit the scope of the claims of the present invention but exemplify the invention. All of the features and the combinations thereof described in the embodiments are not necessarily essential to the invention, and constructions and arrangements to be employed selectively are included in the invention.

DESCRIPTION OF EMBODIMENTS

Figure 1:
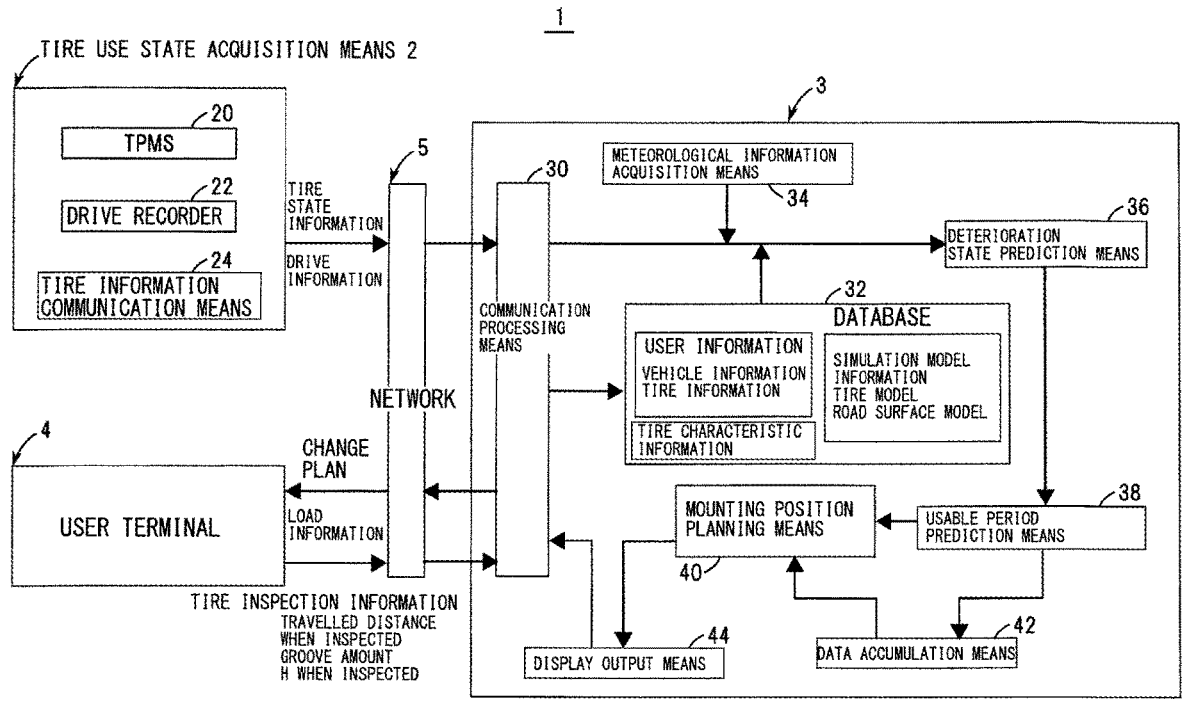
FIG. 1 is a view showing an outline configuration of a tire management device.

FIG. 1 is a configuration view showing an embodiment of a tire management device.

A tire management device 1 is configured from a tire use state acquisition means 2 for acquiring a tire use state, a server 3 for managing tires, and a user terminal 4.

[Configuration of Tire Use State Acquisition Means]

The tire use state acquisition means 2 is mounted on a vehicle and acquires information relating to a use state of each tire of the vehicle. The tire use state acquisition means 2 is configured from, for example, TPMS (Tire Pressure Monitoring System) 20, a drive recorder 22, a tire information communication means 24, etc.

The TPMS 20 is an apparatus for measuring the temperature and pressure of air in the tire by sensors provided in the air chamber of the tire. Information relating to the temperature and pressure measured and transmitted by the TPMS 20 is accumulated as data of a temperature history and a pressure history during the tire use period into a main body unit provided in the cabin and recorded as tire state information showing the tire states. The drive recorder 22 has a gyro sensor and GPS and is electrically connected with the vehicle to record vehicle drive information. The drive recorder 22 records a time-series change of information relating to travelling states, for example, a travelling distance and speed, an engine speed, an idling time, the acceleration of a vehicle, a travelling route, etc.

The tire information communication means 24 is an apparatus for communicating with the server 3 and the user terminal 4 through a network line 5. The tire information communication means 24 is connected with the TPMS 20 and the drive recorder 22, and transmits the tire state information and drive information recorded in each apparatus to the server 3. The tire state information and drive information to be transmitted from the tire information communication means 24 may be transmitted to the user terminal 4 through the network line 5 and then from the user terminal 4 to the server 3 or may be configured to be transmitted to both the server 3 and the user terminal 4. Thus, the tire use state acquisition means 2 is configured to automatically acquire the tire state information and operating state of the tires in use and to transmit to the server 3.

[Configuration of Server]

Figure 2:
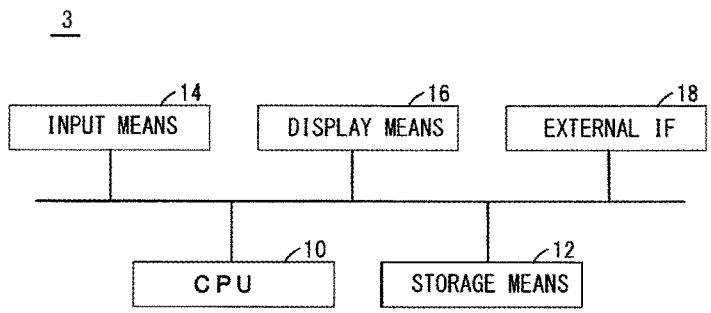
FIG. 2 is a view showing a server configuration.

FIG. 2 is a view showing an outline structure of the server 3. The server 3 is provided with a CPU 10 as a computing means which is provided as a hardware resource, a storage means 12 such as a ROM and a RAM, an input means 14 such as a keyboard and a mouse, or a magnetic or optical drive, a display means 16 such as a monitor, an external connection interface (external IF) 18 for connecting a network interface, an external device, etc. The CPU 10 executes later-described processing according to each program stored in the storage means 12 to make the server 3 function as each means described later. The server 3 is managed by, for example, a tire manufacturer, a contractor commissioned by the tire manufacturer, a tire seller, etc.

As shown in FIG. 1, the server 3 is provided with a communication processing means 30, database 32, a meteorological information acquisition means 34, a deterioration state prediction means 36, a usable period prediction means 38, a mounting position planning means 40, a data accumulation means 42, and a display output means 44. The communication processing means 30 establishes communications with the above-described tire use state acquisition means 2 and user terminal 4.

[Database]

The database 32 includes user information, tire characteristic information, and simulation model information. The user information includes, for example, vehicle information relating to a vehicle on which the management target tires are mounted, and tire information relating to the tires mounted on the vehicle. The vehicle information includes vehicle-related information, for example, a date of registration of tires to be managed, an update date of tire information, a business type using a vehicle, a vehicle type, a vehicle number, the number of shafts such as a steering shaft, a drive shaft and a trailer shaft, specifications such as the presence or not of an axle lift mechanism (lift axle mechanism), an axle load, an axle length and an axle load without any load, and ID number of the tire information communication means 24, etc.

The tire information includes a date of mounting a tire on a vehicle and a traveled distance of the vehicle on that day, a mounted position, a tire type of each mounted position, the presence or not of a retreading history, a retreaded date when there is a retreading history, the presence or not of a rotation history, a mounted position changed date when there is a rotation history, a changed position and a traveled distance at that point of time, etc.

The user information including the above vehicle information and tire information is managed with, for example, a user ID used when the subject tires are registered. The "user" denotes a person who operates the user terminal 4 to check the information provided by the server 3, such as a driver, a carrier, a retreading worker, a tire seller, etc.

The above user information and vehicle information can be input by, for example, a user through the network line 5 or an administrator of the server 3.

The tire characteristic information includes physical property values of material physical properties (elastic properties and heat conductive property) of respective rubber members and material physical properties (stiffness property and heat conductive property) of the cord member constituting a management target tire. The physical property values include material characteristics such as density $\rho$, elastic coefficient z (longitudinal elastic coefficient, transverse elastic coefficient), a loss tangent (hereinafter referred to as tan $\delta$), and an elastic modulus of a bead core, and specific heat c, thermal conductivity k, diffusion coefficient D, etc. The tire characteristic information is stored in the database 32 in association with the tire type.

The simulation model information has a tire model M obtained by modeling management target tires and a road surface model N on which tires are assumed to have traveled. The tire model M is created, for example, on the basis of CAD data used at the time of designing the tire so as to correspond to the shape and structure of each tire type. And, the tire model M is created as a three-dimensional solid model or a two-dimensional cross-sectional model and configured as an assembly of multiple elements for respective members constituting the tire. The tire model M is previously stored in multiple for each tire type, and if a tire is exchanged, a tire model M corresponding to the exchanged new type can be read.

The road surface model N is modeled as, for example, a plate element of a flat rigid body. It may be modeled including a solid element so as to reproduce an actual rough road surface. The tire model M and the road surface model N are not limited to the above embodiment but may be any type of model if simulatable. In addition, the road surface model N can be omitted by giving as a boundary condition to the tire model M by later processing.

[Meteorological Information Acquisition Means]

The meteorological information acquisition means 34 is a means for acquiring information relating to weather and air temperature and acquires, for example, information relating to meteorology including weather, air temperature, etc. from the Meteorological Agency and a private company that provides meteorological information through the network line 5. The meteorological information acquisition means 34 automatically acquires, for example, a daily meteorology change in weather, air temperature, etc. at each location every day or every hour. The meteorological information acquired by the meteorological information acquisition means 34 is stored as a meteorological history in the database 32. The meteorological information is not limited to acquisition by the meteorological information acquisition means 34 and may be acquired by manual input by an administrator who manages the server 3 or may combine the acquisition by manual input and the acquisition by the meteorological information acquisition means 34.

[Deterioration State Prediction Means]

Figure 3:
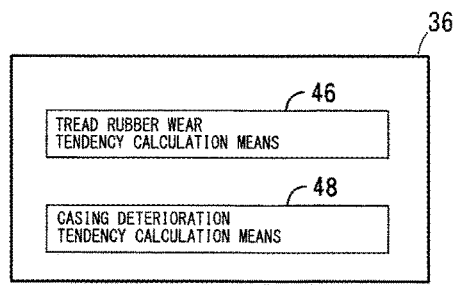
FIG. 3 is a block diagram showing an embodiment of a configuration of a deterioration state prediction means.

FIG. 3 is a block diagram showing one embodiment of a configuration of the deterioration state prediction means 36. As shown in the figure, the deterioration state prediction means 36 is provided with a tread rubber wear tendency calculation means 46 for calculating a wear tendency of the tread rubber and a casing deterioration tendency calculation means 48 for calculating a deterioration tendency of the tire casing.

Figure 4:
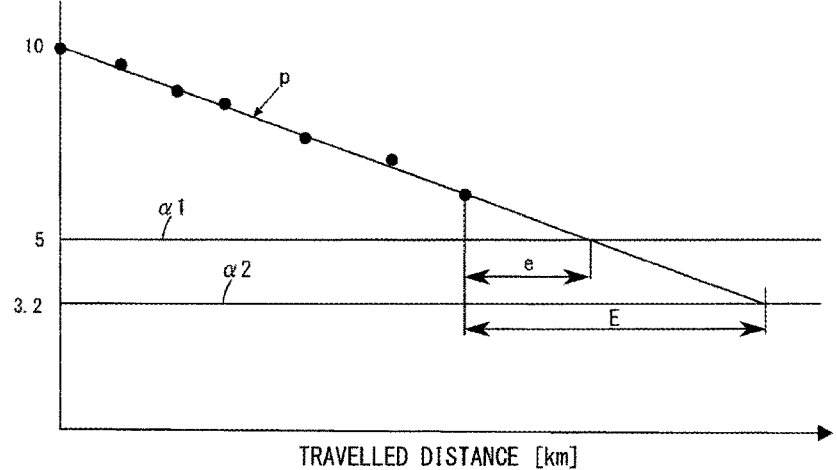
FIG. 4 is a graph showing an example of a wear tendency of a tread rubber.

The tread rubber wear tendency calculation means 46 calculates, for example, a wear tendency of the tread rubber of each tire on the basis of tire inspection information about a tire to be managed which is input from the user terminal 4 through the network line 5. FIG. 4 is a graph showing an example of a wear tendency of the tread rubber. Plots shown in the figure show a traveled distance input from the user terminal 4 by daily inspection and a remaining groove amount H at that traveled distance. The tread rubber wear tendency calculation means 46 calculates correlations between the input traveled distance and the remaining groove amount H by primarily approximating, for example, by least square approximation or the like so as to calculate a wear tendency line p showing the tire wear tendency.

Figure 5:
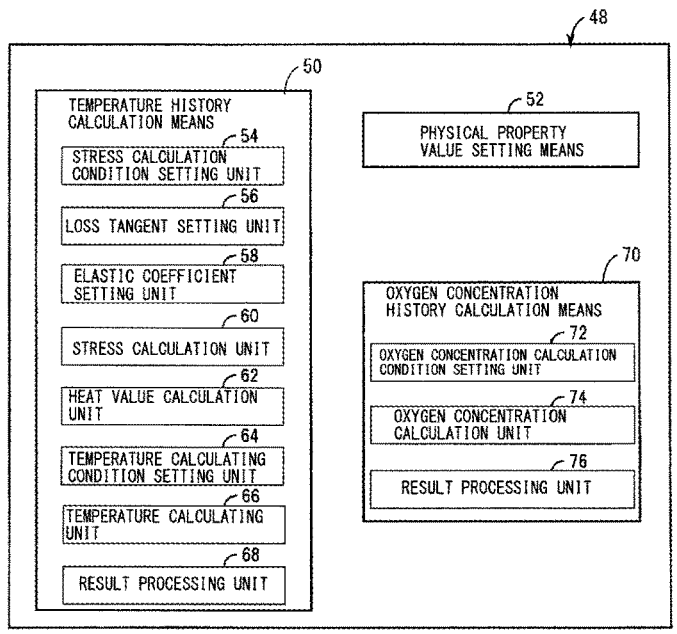
FIG. 5 is a view showing an embodiment of a configuration of a casing deterioration tendency calculation means.

FIG. 5 is a view showing an embodiment of the configuration of the casing deterioration tendency calculation means 48. The casing deterioration tendency calculation means 48 reads the tire model M corresponding to the management target tire from the database 32 and calculates a deterioration tendency of the casing by simulating the tire deterioration state time-serially by using the tire model M.

As shown in FIG. 5, the casing deterioration tendency calculation means 48 is provided with roughly a temperature history calculation means 50, a physical property value setting means 52, and an oxygen concentration history calculation means 70.

The physical property value setting means 52 reads the tire model M and the tire characteristic information which are read from the database 32 and sets the above-described physical property values for each of the plural elements configuring the tire model M.

The temperature history calculation means 50 calculates, for example, a history of temperatures generated in the tire from its brand-new state to the present time. The temperature history calculation means 50 is provided with a stress calculation condition setting unit 54, a loss tangent setting unit 56, an elastic coefficient setting unit 58, a stress calculation unit 60, a heat value calculation unit 62, a temperature calculating condition setting unit 64, a temperature calculating unit 66, and a result processing unit 68. The stress calculation condition setting unit 54, the loss tangent setting unit 56, the elastic coefficient setting unit 58, and the stress calculation unit 60 are means for predicting the heating value considering heat generation caused due to deformation during tire use, and functions as a shape analysis means during tire use.

The temperature history calculation means 50 uses the tire model M (solid model) of which physical property values are set by the physical property value setting means 52 to calculate a temperature history as described below.

The stress calculation condition setting unit 54 sets conditions, which are required to calculate stress σ and strain ε of the tire R in use by the stress calculation unit 60 described later, to the tire model M. For example, the stress calculation condition setting unit 54 specifies the mounted position of the tire R on the vehicle based on the tire information, obtains the axle load of the vehicle at the relevant position, and calculates a mounted load at the pertinent position on the basis of load information. And, the load acting on the tire R is set to the tire model M by combining the mounted load and the axle load. Since the load acting on the tire is transmitted from the rim to the tire R and then to the road surface, it is set, for example, to a node of the element corresponding to the position in contact with the rim in the tire model M. For example, a rigid body condition having no change (no change condition) in mutual positional relation is set to the node which is contacted to the rim. The condition to be set to the node to which the rim is contacted is not limited to the above rigid body condition and, for example, a constraint condition or the like is also set to constrain only the contact to the rim so that the state of contact to the rim is kept but a change in the positional relation between the nodes is allowed. And, a pressure on the basis of the tire inside pressure data is set to elements constituting the air chamber of the tire R.

The loss tangent setting unit 56 sets the value of tan δ which is set as a function to each element of the tire model M by the physical property value setting means 52. The tan δ must be substituted by a numerical value because it is set as a function of temperature T. Accordingly, the loss tangent setting unit 56 calculates the numerical value of tan δ by giving the temperature T to the tan δ which is set as a function to each element. The relation between the tan δ and the temperature T can be obtained by, for example, preparing test specimens of all the rubber members constituting the tire and measuring the tan δ at each temperature while varying the heating temperature according to JIS K6394 and IPSO 4664. The obtained relation between the tan δ and the temperature T is, for example, functionality using least square approximation or the like and registered in the database 32. The loss tangent setting unit 56 obtains such a function from the database 32, calculates the tan δ of the corresponding temperature T for each rubber member every time the temperature T of each element is set and updated, and sets the quantified tan δ to each element.

The elastic coefficient setting unit 58 calculates the elastic coefficient value which is set as a function to each element of the tire model M. Since the elastic coefficient is set as a function of the temperature T similar to the above tan δ, it must be replaced by a numerical value. Therefore, similar to the tan δ, the relation between the elastic coefficient and the temperature T is predetermined as a function for each rubber member by an experiment, the elastic coefficient at the corresponding temperature T is calculated for each rubber member every time the temperature T is set and updated for each element, and the quantified elastic coefficient is set to each element.

The stress calculation unit 60 sets a state that the tire model M is contacted to the road surface model N and calculates the stress σ and strain ε acting on the tire R running. Specifically, the stress calculation unit 60 calculates the stress σ and strain ε of each element by performing stress analysis of each element on the basis of the conditions, such as the pressure and load in the tire set by the stress calculation condition setting unit 54, and physical property values showing the material characteristics, such as the density ρ, loss tangent tan δ, elastic coefficient, and stiffness of the bead core which are set for each element by the physical property value setting means 52.

The heat value calculation unit 62 calculates heating value Q involved in deformation during use of the tire. The tire R is deformed when grounded and rolled on the road surface, and a strain is caused on each member. It is considered that the strain causes a strain energy loss when the tire R rolls and is mostly emitted as heat. Therefore, the heating value Q is calculated by an equation (shown on the right side of [Formula. 1]) for calculating strain energy.

$$Q = V \times \sigma \times \varepsilon \times \tan \delta \quad \text{[Formula. 1]}$$

where, V denotes a volume of each element, σ denotes a stress of each element, ε denotes a strain of each element, and tan δ denotes a loss tangent of each element. The volume V of each element adopts a size of the tire model M having a shape with no load.

The temperature calculation condition setting unit 64 sets to the tire model M a temperature initial condition and a temperature condition for calculating a temperature of the tire R by the later-described temperature calculating unit 66. The temperature initial condition is set to all elements. For example, as the temperature initial condition, the temperature T when the TPMS 20 starts measuring is set to all elements. A brand-new tire R which is just assembled on the rim and applied with an inner pressure can be considered that its temperature and air temperature T in the air chamber are the same as the outside air temperature. Therefore, the temperature T measured by the TPMS 20 is regarded as a measured outside air temperature, and the same temperature T is set as the initial temperature to all elements of the tire model M.

The temperature condition is set to each node corresponding to the tire outer peripheral surface. And, a heat transfer condition according to the speed is set to the node of the tire outer peripheral surface, and a temperature recorded in meteorological history data is set as an atmosphere temperature. And, the heat transfer coefficient from the tire to the air in the air chamber and the heat transfer coefficient from the air in the air chamber to the tire are set to each node corresponding to the tire inner peripheral surface (boundary between the air chamber model Mc and the tire model M).

The node corresponding to the tire inner peripheral surface is a node provided on the boundary between the inner liner surface and the air chamber. And, the elements of the tire outer peripheral surface are nodes positioned on the boundary between the atmosphere air and the surfaces of a rim cushion rubber, a side rubber and a tread rubber. And, when it is set to have an exhaust port on a vehicle side portion, namely between the steering shaft and the driving shaft, when vehicle information is input, the temperature of exhaust gas emitted from the exhaust port is set to the outer peripheral surface of the tire positioned at the back of the exhaust port.

The temperature calculating unit 66 calculates a temperature when the tire R is used for each element of the tire model M. In this embodiment, the heating value Q involved in deformation of the tire R is considered when the above calculation is made, and the temperature of each part of the tire R is calculated on the basis of the conditions set by the above-described temperature calculation condition setting unit 64.

The temperature calculating unit 66 determines the equation (unsteady heat transfer equation) shown in [Formula. 2] as a basic equation, converts this [Formula. 2] to a finite element equation (discretization equation) by a finite element method, and performs time integration of the temporal differentiation term on the left side to calculate the temperature of each element after prescribed time Δt. That is, calculation start time t0 of the temperature T by the temperature calculating unit 66 is set to a time when the tire is brand new, and calculation is repeated up to the present time END so to progress at each time interval Δt. Thus, a temperature history of the tire R, in detail a time history of the temperature T of each element of the tire model M is calculated.

$$\rho c \frac{\partial T}{\partial t} = \frac{\partial}{\partial x_i}\left(k \frac{\partial T}{\partial x_i}\right) + Q \ (i = 1, 2, 3) \quad \text{[Formula. 2]}$$

where, ρ denotes a density, c denotes specific heat, k denotes thermal conductivity, and Q denotes a heating value.

The temperature calculating unit 66 calculates temperature T of the tire R at each time by [Formula. 2] considering the heat generation due to deformation when the tire is used, but as described above, the elastic coefficient and tan δ of each rubber member for calculating the heating value Q are functions of the temperature T. That is, the heating value Q is also a function of the temperature T. Therefore, the temperature T of the tire R is calculated in this embodiment by continuously performing computation of the temperature T of each element by [Formula. 2] of the temperature calculating unit 66, computation of the heating value Q to be input to [Formula. 2], and calculation of a stress of the tire R for obtaining the stress σ and strain ε to be input to [Formula. 1] for calculating the heating value Q. The temperature T of each element at each time calculated by the above continuous computation by the temperature calculating unit 66 is output to the result processing unit 68 each time calculation is performed.

The result processing unit 68 executes result processing of the temperature T at each time input from the temperature calculating unit 66. The result processing unit 68 calculates, for example, the average value of temperatures T of respective tire constituting members and the average value of temperatures T of the whole tire every time the temperature T of each element is input from the temperature calculating unit 66. In addition, the calculated average value is sequentially stored and generated as a temperature history of each tire constituting member, a temperature history of the whole tire, etc. For example, the temperature history of the whole tire is output to the usable period prediction means 38.

As shown in FIG. 5, the oxygen concentration history calculation means 70 has an oxygen concentration calculation condition setting unit 72, an oxygen concentration calculation unit 74, and a result processing unit 76. The oxygen concentration calculation condition setting unit 72 sets an oxygen concentration initial condition and an oxygen concentration boundary condition for calculation of the oxygen concentration by the later-described oxygen concentration calculation unit 74 to the tire model M. The oxygen concentration history calculation means 70 calculates, for example, an oxygen concentration history in the tire model M stored in the database 32 by using a cross-sectional model. The oxygen concentration initial condition is set to all elements of the tire model M. For an oxygen concentration C to be set as the initial condition, for example, 0 (zero) is set. The oxygen concentration boundary condition is set to elements constituting the tire inner peripheral surface and outer peripheral surface. An oxygen concentration C to be set as a boundary condition is set according to the air volume sealed into the air chamber, for example, for the elements of the tire inner peripheral surface. As one example, it is set that every time when the oxygen concentration C is calculated by the oxygen concentration calculation unit 74 described later, an oxygen concentration ΔC portion, which is moved from the elements constituting the tire inner peripheral surface to the element provided inward (carcass side) by one, is decreased from the oxygen concentration C in the air chamber. That is, it is set to the element so as to decrease the oxygen concentration ΔC for the portion moved into the tire from the oxygen concentration C in the air chamber at the previous time by one. And, the oxygen concentration C contained in the atmosphere is set to the elements corresponding to the tire outer peripheral surface.

The oxygen concentration calculation unit 74 calculates the oxygen concentration C in each element of the tire R on the basis of temperature history data calculated by the temperature history calculation means 50 and an oxygen concentration initial condition and an oxygen concentration boundary condition to be set by the oxygen concentration calculation condition setting unit 72. The oxygen concentration calculation unit 74 determines the equation (unsteady diffusion equation) shown in [Formula. 3] as a basic equation, converts [Formula. 3] to a finite element equation (discretization equation) by a finite element method, and performs time integration of the temporal differentiation term on the left side to calculate a time history of the oxygen concentration C of each element of the tire model M. The oxygen concentration calculation unit 74 outputs to the result processing unit 76 every time when the oxygen concentration C of the tire R at each time is calculated.

$$\frac{\partial C}{\partial t} = \frac{\partial}{\partial x_i}\left(D(T)\frac{\partial C}{\partial x_i}\right) - \omega(T) \quad \text{[Formula. 3]}$$

where, C denotes an oxygen concentration, D(T) denotes a diffusion coefficient, and ω(T) denotes an oxygen consumption amount. The ω(T) denotes a reaction term due to oxidation of the rubber member. As shown in the equation, the diffusion coefficient D(T) and the oxygen consumption amount ω(T) are functions of a place and temperature T.

The diffusion coefficient D(T) of each element is calculated by [Formula. 4], and the oxygen consumption amount ω(T) is calculated by [Formula. 5]. As shown in [Formula. 4] and [Formula. 5], the diffusion coefficient D(T) and the oxygen consumption amount ω(T) are functions of the temperature T, so that the temperature T at a time corresponding to the time integration made by the oxygen concentration calculation unit 74 is obtained from the temperature history data.

$$D(T) = D_0 \exp\left(-\frac{E_{0D}}{kT}\right) \quad \text{[Formula. 4]}$$

$$\omega(T) = \omega_0 \exp\left(-\frac{E_{0\omega}}{kT}\right) \quad \text{[Formula. 5]}$$

where, $D_0$ denotes a diffusion coefficient as reference, $E_{0_D}$ denotes activation energy, $\omega_0$ denotes an oxygen consumption amount as reference, $E_{0_\omega}$ denotes each activation energy, and κ denotes a Boltzmann constant. These numerical values are set as physical property values to each member corresponding to each element and set as physical property values to each element.

The result processing unit 76 executes result processing of the oxygen concentration C at each time input from the oxygen concentration calculation unit 74. Every time when the oxygen concentration C of each element is input from the oxygen concentration calculation unit 74, the result processing unit 76 detects, for example, the maximum value of the oxygen concentration C and calculates the average value of the oxygen concentrations C of every tire constituting member and the average value of the oxygen concentration C of the whole tire. In addition, the detected maximum value and the calculated average value are sequentially accumulated, and a maximum oxygen concentration history, an oxygen concentration history of each tire constituting member and an oxygen concentration history of the whole tire are generated. In this embodiment, it is explained assuming that the succeeding processing is performed on the basis of the oxygen concentration history of the whole tire, but the maximum oxygen concentration history can also be used. And, the result processing unit 76 calculates the oxygen concentration history of the whole tire as primary approximation by, for example, least square approximation or the like so as to calculate a deterioration tendency line q for predicting a wear tendency of the casing, and outputs to the usable period prediction means 38.

Figure 6:
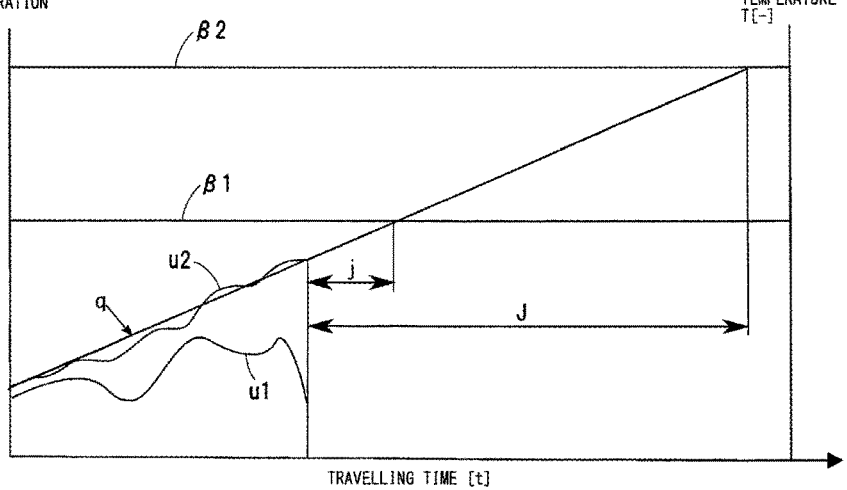
FIG. 6 is a view showing a temperature history line and an oxygen concentration history line.

FIG. 6 is a graph showing a temperature history line and an oxygen concentration history line output from the temperature history calculation means 50 and the oxygen concentration history calculation means 70. In the same figure, u1 denotes the temperature history line showing a history of the average temperature of the whole tire, and u2 denotes the oxygen concentration history line showing a history of the average oxygen concentration of the whole tire. And, β denote the maximum value of the oxygen concentration that tire retreading is allowed, and β2 denotes a limit value of the oxygen concentration showing a casing use limit. And q indicates a deterioration tendency line.

The wear tendency line p of each tire and the deterioration tendency line q of the casing calculated by the deterioration state prediction means 36 are also a tread rubber wear tendency and a casing deterioration tendency of each tire mounted position of a vehicle. Then, the wear tendency line of the tread rubber and the deterioration tendency line q of the casing of each calculated tire are set as mounting position deterioration characteristics at each mounted position of the vehicle tires and stored in the data accumulation means 42.

[Usable Period Prediction Means]

On the basis of the wear tendency line p of the tread rubber and the deterioration tendency line q of the casing calculated by the above-described deterioration state prediction means 36, the usable period prediction means 38 calculates a travelable distance e until a groove remaining amount H of the tread rubber when the tire is continuously used at the present mounted position reaches a retreadable groove depth, a travelable distance E until it reaches a use limit groove depth, a travelable time j until it reaches a retreadable oxygen concentration in the casing, and a travelable time J until it reaches a use limit of the oxygen concentration. (see FIG. 4 and FIG. 6).

Specifically, on the basis of the wear tendency line p obtained by the tread rubber wear tendency calculation means 46, the usable period prediction means 38 calculates the travelable distance e until the groove remaining amount H of the tread rubber of each tire reaches a retread groove allowable value $\alpha 1$ and the travelable distance E until it reaches a groove use limit value $\alpha 2$. The retread groove allowable value $\alpha 1$ is a groove depth that the tread rubber can be retreaded, and the groove use limit value $\alpha 2$ is a groove depth that the tread rubber becomes a use limit. And, on the basis of the deterioration tendency line q, the usable period prediction means 38 calculates a travelable distance j until an oxygen concentration in the casing of each tire reaches a retreading oxygen concentration allowable value $\beta 1$ and a travelable distance J until it reaches an oxygen concentration limit value $\beta 1$. The retreading oxygen concentration allowable value $\beta 1$ is an oxygen concentration in a retreadable casing, and the oxygen concentration limit value $\beta 1$ is an oxygen concentration when the casing comes to a use limit.

The travelable distance e to be calculated becomes a positive numerical value larger than 0 (zero) when it does not exceed the retread groove allowable value $\alpha 1$ and becomes a negative numerical value smaller than 0 (zero) when it exceeds the retread groove allowable value $\alpha 1$. And, the travelable distance E becomes a positive numerical value larger than 0 (zero) when the groove use limit value $\alpha 2$ is not exceeded and becomes a negative numerical value smaller than 0 (zero) when the groove use limit value $\alpha 2$ is exceeded. The travelable time j becomes a positive numerical value larger than 0 (zero) when the retreading oxygen concentration allowable value $\beta 1$ is not exceeded and becomes a negative numerical value smaller than 0 (zero) when the retreading oxygen concentration allowable value $\beta 1$ is exceeded. And, the travelable time J becomes a positive numerical value larger than 0 (zero) when the oxygen concentration limit value $\beta 2$ is not exceeded and becomes a negative numerical value smaller than 0 (zero) when the oxygen concentration limit value $\beta 2$ is exceeded.

The mounting position planning means 40 creates a change plan for mounted positions on the basis of the travelable distances e and E and the travelable times j and J of each tire predicted by the usable period prediction means 38. Planning processing of a specific change plan will be described later.

[Data Accumulation Means]

The data accumulation means 42 stores information such as each parameter at a time when the wear tendency line p of the tread rubber and the deterioration tendency line q of the casing are calculated by the deterioration state prediction means 36, vehicle characteristics on the basis of the calculated wear tendency line p and deterioration tendency line q, and a change plan of the mounted positions by the mounting position planning means 40.

[Display Output Means]

The display output means 44 outputs, on the basis of the input from the input means 14, to display the contents processed by the above-described respective means and the information stored in the database 32 on the display means 16. For example, the display output means 44 performs display output processing to display the created change plan and also a tire present state. For example, the display output processing is performed when accessed from the later-described user terminal 4 to the server 3.

The user terminal 4 has a CPU as a computing means which is provided as a hardware resource, a storage means such as a ROM, a RAM, etc., an input means such as a keyboard, a mouse, a magnetic or optical drive, a display means such as a monitor, an external connection interface (external IF) for connecting a network interface, an external device, etc. The CPU executes the later-described processing according to each program stored in the storage means to cause the user terminal 4 function as a terminal device of the server 3.

The storage means of the user terminal 4 stores tire inspection information such as the groove remaining amount H and the traveled distance at that time of each tire measured by a daily inspection and load information in daily operations. Such information is sent to the server 3, stored in the database 32, and accumulated. And, the display means of the user terminal 4 shows tire present state information and a change plan of tire mounted positions provided from the server 3.

An operation method and processing flow of the tire management device 1 are explained below. The following description shows an example that all tires of one vehicle are replaced to brand-new tires, and all tires are managed. And, the vehicle and the respective tires are mounted with the above-described the tire use state acquisition means 2.

Figure 7A:
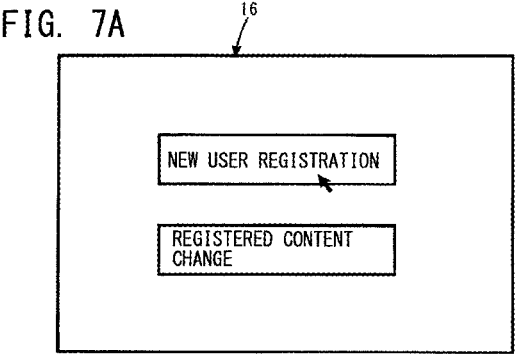
FIGS. 7A-7D are views showing an example of an input setting screen.

FIG. 7A-7D are views showing an example of setting screens when user information is registered in the server. As shown in FIG. 7A, the display means 16 shows a screen on which, for example, new user registration or a registered content change is selected. A registration operator operates the input means 14 to select either one from the selection screen. Here, new user registration is selected. When the new user registration is selected, the display screen is changed from the selection screen shown in FIG. 7A to the vehicle setting screen shown in FIG. 7B. The registration operator selects the same type as the subject vehicle from vehicle chassis views (1) to (6) shown on the vehicle setting screen. In this example, for example, (2) is selected.

Figure 7B:
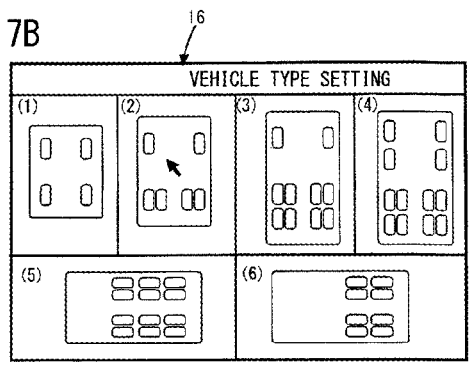
Figure 7C:
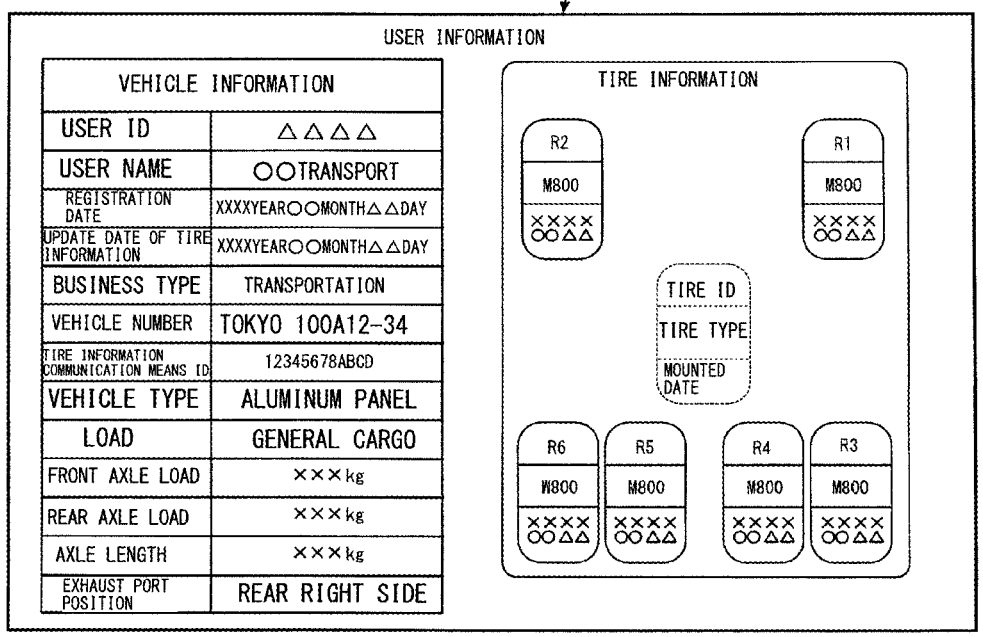

When the vehicle setting is selected, the display screen is switched from the vehicle setting screen shown in FIG. 7B to the user registration screen shown in FIG. 7C. The registration operator enters the user information such as vehicle information and tire information into each item shown on the registration screen shown in FIG. 7C.

Figure 7D:
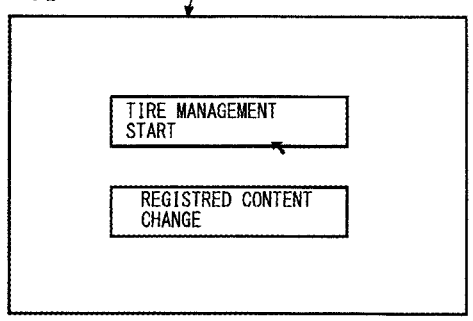

When the tire management start is selected on the display screen shown in FIG. 7D, communications are established among the server 3, the tire use state acquisition means 2 and the user terminal 4. Subsequently, the tire state information and the drive information are automatically sent from the tire use state acquisition means 2 to the server 3, and the tire inspection information and load information can be input from the user terminal 4 to the server 3. And, a mounted position change plan provided from the server 3 can be displayed and browsed.

When the vehicle setting is selected, the display screen is switched from the vehicle setting screen shown in FIG. 7(b) to the user registration screen shown in FIG. 7(c). The registration operator enters the user information such as vehicle information and tire information into each item shown on the registration screen shown in FIG. 7(c).

When the tire management start is selected on the display screen shown in FIG. 7(d), communications are established among the server 3, the tire use state acquisition means 2 and the user terminal 4. Subsequently, the tire state information and the drive information are automatically sent from the tire use state acquisition means 2 to the server 3, and the tire inspection information and load information can be input from the user terminal 4 to the server 3. And, a mounted position change plan provided from the server 3 can be displayed and browsed.

After the registration work is completed, the tire state information and drive information to be input from the tire use state acquisition means 2, and also the tire inspection information and load information to be input from the user terminal 4 are sent to the server 3, and each information is successively accumulated in the database 32. And, every time the load information and the tire inspection information are input from the user terminal 4, a wear tendency of the tread rubber and a deterioration tendency of the casing are predicted by the deterioration state prediction means 36 in the server 3.

In addition, the above described travelable distance e, travelable distance E, travelable time j, and travelable time J are calculated on the basis of the wear tendency of the tread rubber and the deterioration tendency of the casing predicted by the usable period prediction means 38. The travelable distances e and E of the tread rubber and the travelable times j and J of the casing of the respective tires R1 to R6 predicted by the usable period prediction means 38 are output to the mounting position planning means 40 and the data accumulation means 42.

Figure 8:
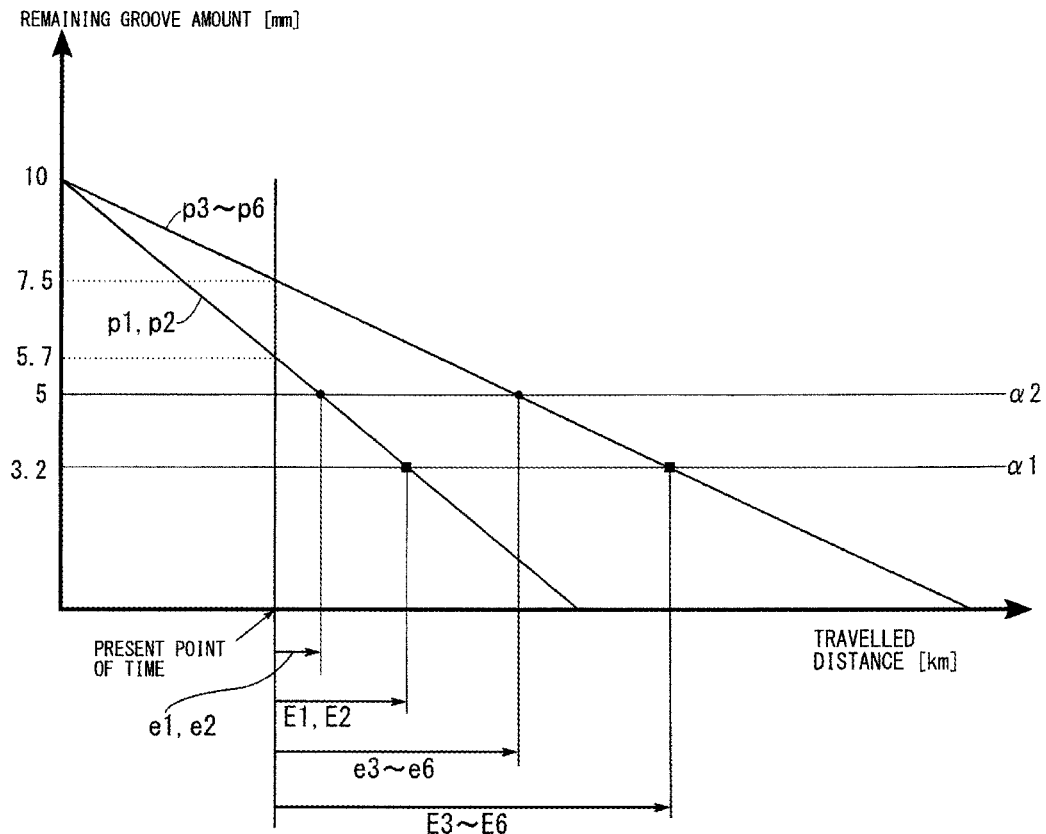
FIG. 8 is a graph showing a wear tendency of tread rubber due to a difference of tire mounted positions.

FIG. 8 is a graph showing an example of the wear tendency of tread rubber of the tires R1 to R6 calculated by the tread rubber wear tendency calculation means 46. In the same graph, p1 to p6 of solid lines indicate wear tendency lines of the respective tires R1 to R6 predicted by the tread rubber wear tendency calculation means 46. Specifically, the wear tendency lines p1 and p2 correspond to the tires R1 and R2, and the wear tendency lines p3 to p6 correspond to the tires R3 to R6. The mounted positions of the tires R1 to R6 are shown in FIG. 7(c) 7C. And, all the tires R1 to R6 are not undergone rotation, retreading, etc. after they were mounted as brand-new tires. The groove remaining amount H of the tires R1 and R2 at the present time is 5.7 mm, and the groove remaining amount H of the tires R3 to R6 is 7.5 mm. It is seen that the tires R1 and R2 of the steering wheels are worn down faster on the tread rubber in comparison with the tires R3 to R6 of the driving wheels.

Figure 9:
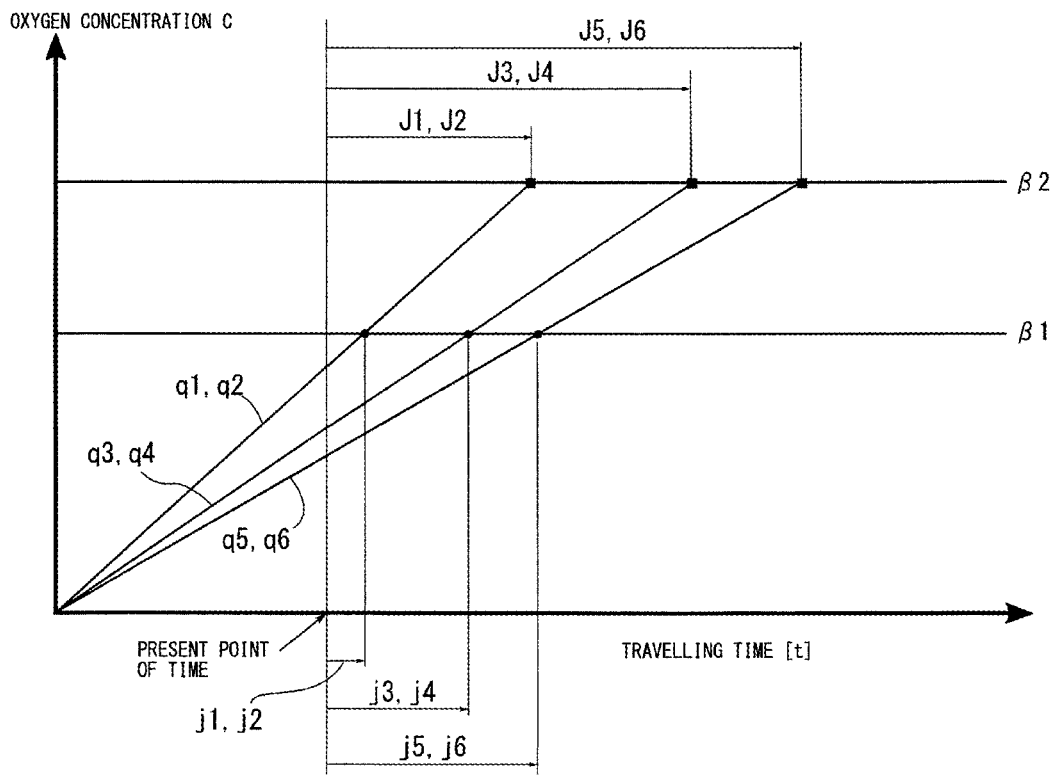
FIG. 9 is a graph showing a deterioration tendency of a casing due to a difference of tire mounted positions.

FIG. 9 is a graph showing an example of deterioration tendency of casings of the tires R1 to R6 calculated by the casing deterioration tendency calculation means 48. Solid lines q1 to q6 in FIG. 9 indicate deterioration tendency lines of the tires R1 to R6 predicted by the casing deterioration tendency calculation means 48.

Specifically, deterioration tendency lines q1 and q2 correspond to tires R1 and R2, deterioration tendency lines q3 and q4 correspond to tires R3 and R4, and deterioration tendency lines q5 and q6 correspond to tires R5 and R6. Respective mounted positions of respective tires R1 to R6 are as shown in FIG. 7C. And, after all tires R1 to R6 are mounted as brand-new tires, tire rotation, retreading etc. have not been performed. Casings of the tires R1 and R2 at the present time are deteriorated more than the casings of the tires R3 to R6. In addition, the casings of tires R3 and R4 are deteriorated more than the casings of the tires R5 and R6. The tires R3 and R4 are mounted on the same drive shaft as the tires R5 and R6, but since they are exposed to the exhaust gas from an exhaust port z, they are deteriorated faster than the tires R5 and R6.

Figure 10:
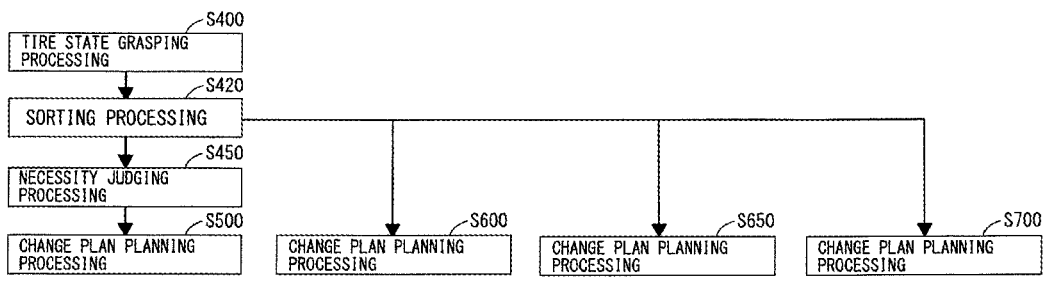
FIG. 10 is an outline flow chart showing a process of creating a change plan for mounted positions by a mounting position planning means.

FIG. 10 is a flow chart showing an outline process of planning a change plan of tire mounted positions by the mounting position planning means 40. The mounting position planning means 40 executes a state grasping processing S400, sorting processing S420 for creating a change plan, necessity judging processing S450 for preparing a change plan, and change plan planning processing S500, S600, S650 and S700. Each processing is explained below.

Figure 11:
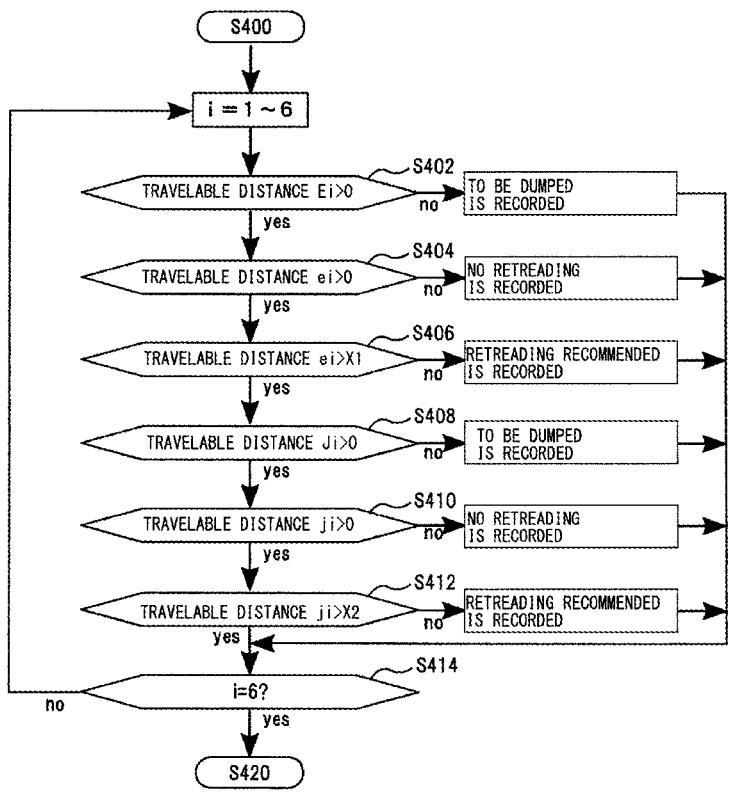
FIG. 11 is a flow chart showing processing in S400.

FIG. 11 is a flow chart showing state grasping processing in S400. In S400, processing is performed to grasp the present state of respective tires R1 to R6 mounted on the vehicle. Suffix i to the travelable distances e and E and the travelable times j and J corresponds to numerals of tire ID numbers (see FIG. 7C).

S402: It is judged whether a travelable distance Ei is larger than 0 (zero), and if larger than 0, the processing moves to S404, but if not larger than 0, to be dumped is recorded on the tire information, the processing moves to S414. That is, it is judged in this step whether the groove remaining amount H of the tread rubber exceeds the groove depth of the used limit value (a2).

S404: It is judged whether a travelable distance ei is larger than 0 (zero), and if it is larger than 0, the processing moves to S406, but if not larger than 0, information "No retreading" is recorded as tire information, and the processing moves to S414. That is, this step judges whether the groove remaining amount of the tread rubber exceeds the groove depth of retreadable limit value ($\alpha$1).

S406: It is judged whether the travelable distance ei is larger than threshold x1, and if it is larger than the threshold x1, the processing moves to S408, but if not larger than the threshold x1, information "retreading recommended" is recorded as tire information, and the processing moves to S414. The threshold x1 is used to judge whether a retreading time is near, and a predetermined distance is set in advance. That is, this step judges whether the retreading time is near.

S408: It is judged whether travelable time Ji is larger than 0 (zero), and if larger than 0, the processing moves to S410, and if not larger than 0, information "to be dumped" is recorded as tire information, and the processing moves to S414. That is, this step judges whether the oxygen concentration C in the casing exceeds the use limit value (132).

S410: It is judged whether the travelable time ji is larger than 0 (zero), and if larger than 0, the processing moves to S412, and if not larger than 0, information "No retreading" is recorded as tire information, and the processing moves to S414. That is, this step judges whether the oxygen concentration C in the casing exceeds a retreadable limit value ($\beta$1).

S412: It is judged whether the travelable time ji is larger than threshold x2, and if larger than the threshold x2, the processing moves to S414, but if not larger than the threshold x2, information "retreading recommended" is recorded on tire information, and the processing moves to S414. The threshold x2 is used to judge whether the retreading time is near, and a prescribed time period is set. In other words, this step judges whether the retreading time is near.

S414: It is judged whether state determination of all tires is completed, and if the state determination of all tires is not completed, the process returns to S402, and if the state determination is completed, the processing moves to S420. Thus, the present states of the respective tires R1 to R6 are grasped.

[S420]

Figure 12:
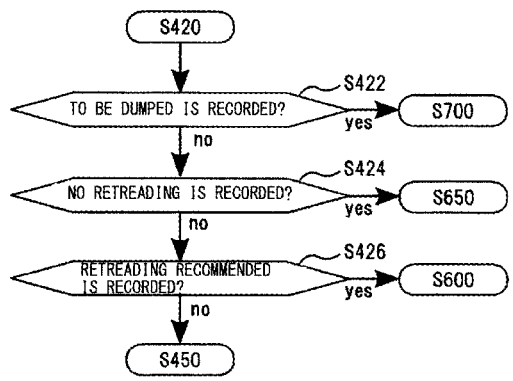
FIG. 12 is a flow chart showing processing in S420.

FIG. 12 is a flow chart showing sorting processing in S420. In S420, on the basis of the tire information updated in S400, sorting of processing of planning a change plan of the mounted positions corresponding to the tire states is executed.

S422: It is judged whether tire information "to be dumped" is recorded on any of tires R1 to R6, and if not recorded, the processing moves to S424, but if recorded, the processing moves to S700.

S424: It is judged whether tire information "No retreading" is recorded on any of tires R1 to R6, and if not recorded, the processing moves S426, but if recorded, the processing moves to S650.

S426: It is judged whether tire information "retreading recommended" is recorded on any of tires R1 to R6, and if not recorded, the processing moves to S450, but if recorded, the processing moves to S600.

[S450]

Figure 13:
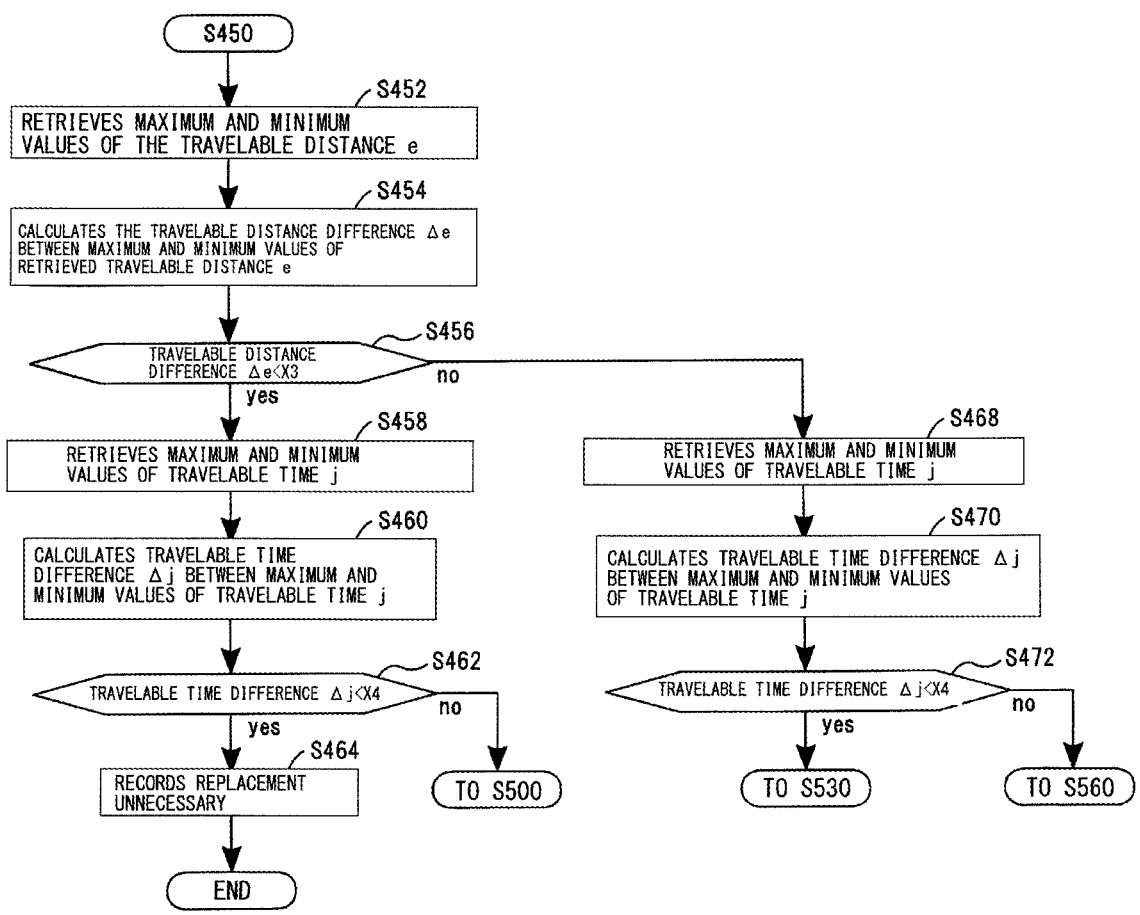
FIG. 13 is a flow chart showing processing in S450.

FIG. 13 is a flow chart showing necessity judging processing in S450. In S450, it is checked whether it is necessary to create a change plan of tires R1 to R6.

S452: The maximum and minimum values of the travelable distance e among the tires R1 to R6 are retrieved.

S454: A difference (travelable distance difference) $\Delta e$ between the maximum and minimum values of the retrieved travelable distance e in S452 is calculated. A difference (a degree of gap) in the groove remaining amount H of the tires R1 to R6 mounted on the vehicle is judged in this step.

S456: It is judged whether a travelable distance difference $\Delta e$ calculated in S454 is smaller than threshold x3, and if smaller than the threshold x3, the processing moves to S458, and if not smaller than the threshold x3, the processing moves to S468. The threshold x3 is used to judge an allowable range of the gap in the groove remaining amount H, and a predetermined distance is set in advance.

S458: Among the tires R1 to R6, the maximum and minimum values of the travelable time j are retrieved.

S460: A difference (travelable time difference) $\Delta j$ between the maximum and minimum values of the travelable time j retrieved in S458 is calculated. This step judges a difference (a degree of gap) of oxygen concentration C in the casing of the tires R1 to R6 mounted on the vehicle.

S462: It is judged whether the travelable time difference $\Delta j$ calculated in S460 is smaller than threshold x4, and if smaller than the threshold x4, the processing moves S464, but if not smaller than the threshold x4, the processing moves to S500. The threshold x4 judges the allowable range of gap of the oxygen concentration C, and a prescribed time period is set.

S464: Information "replacement unnecessary" is recorded as tire information, and the processing is terminated.

S468: Among the tires R1 to R6, the maximum and minimum values of the travelable time j are retrieved.

S470: A difference (travelable time difference) $\Delta j$ between the maximum and minimum values of the travelable time j retrieved in S468 is calculated.

S472: It is judged whether the travelable time difference $\Delta j$ calculated in S470 is smaller than the threshold x4, and if smaller than the threshold x4, the processing moves to S530, but if not smaller than the threshold x4, the processing moves to S560.

The thresholds x3 and x4 which are used for the above-described judgment may be set considering, for example, cost effectiveness required to change the tire mounted positions. That is, though a change in mounted positions can be made in a short cycle but it is desirable to set so that the mounted positions are changed at appropriate intervals (traveled distance or traveled time) because the vehicle operation is possibly affected.

[S500]

Figure 14:
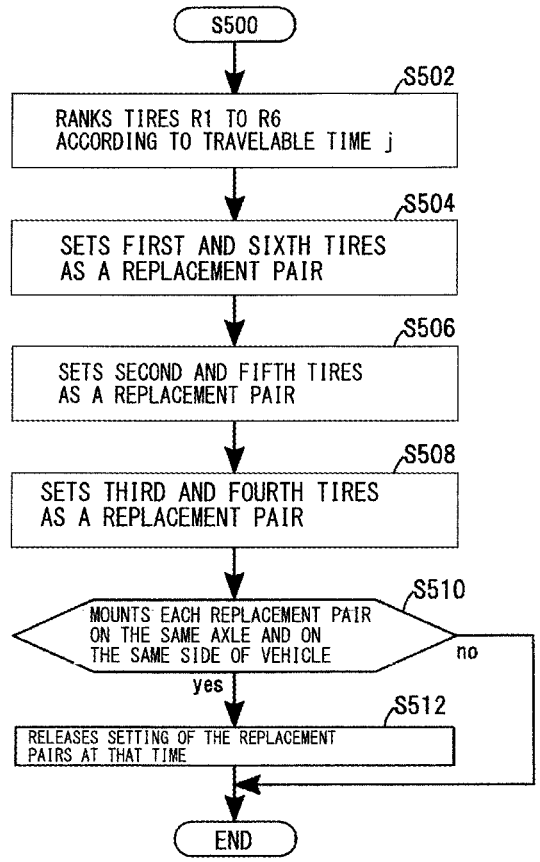
FIG. 14 is a flow chart showing processing in S500.

FIG. 14 is a flow chart showing planning processing in S500. In S500, a change plan is created when a usable period of the tread rubber and the casing is in a retreadable state. Specifically, when the travelable distance difference $\Delta e$ is smaller than the prescribed threshold x3 and the travelable time difference $\Delta j$ is not smaller than the prescribed threshold x4, a change plan for tire mounted positions is created in S500 so as to equalize the deterioration of the casing, in other words, to avoid local deterioration of a tire mounted at a particular position and to extend a total life of the multiple tires as a whole.

S502: Travelable times j1 to j6 corresponding to the respective tires R1 to R6 are ranked in accordance with their length. For example, the travelable times j1 to j6 are ranked in ascending order of their length. Tires mounted on the same axle of the vehicle can be considered that their casings are normally deteriorated equally on the right and left sides, but since the travelable times j1 to j6 are calculated by computer simulation, it can be considered that the numerical values do not become the same on the right and left sides. When the travelable time is the same, for example, it may be ruled that a tire with a smaller tire ID number is set at a high order. And, as another method, the same order may be determined when the travelable times are the same. In this step, for example, the tires R1, R2, R3, R4, R5 and R6 are ranked in the order of one to six.

S504: The first (the shortest travelable time) tire R1 and the sixth (the longest travelable time) tire R6 are set as a replacement pair that their mutual mounted positions are changed.

S506: the second (the second short travelable time) tire R2 and the fifth (the second longest travelable time) tire R5 are set as a replacement pair that their mutual mounted positions are changed.

S508: The third (the third shortest travelable time) tire R3 and the fourth (the third longest travelable time) tire R4 are set as a replacement pair that their mutual mounted positions are changed.

S510: It is judged whether the respective tires which are made into multiple replacement pairs in S504 to S508 are mounted on the same axle and on the same right and left sides of the vehicle, and if the respective conditions are satisfied, the processing moves to S512, and if the conditions are not satisfied, the process is terminated without changing the setting.

S512: When it is judged in S510 that the above conditions are satisfied, the setting about the replacement pairs satisfying the above conditions is released, and the processing is terminated. When the setting of the replacement pairs is released by the above processing, positional replacement is not made. In other words, when the mounted positions of the replacement pair are on the same axle and on the same side of the vehicle, the progress of deterioration is the same, so that even when replacement is performed, the travelable time does not change. Therefore, the labor for replacement of tires can be reduced by releasing the setting of the replacement pair.

And, the replacement pair set by the above process is output as a change plan for mounted positions to the display output means 44.

Figure 15:
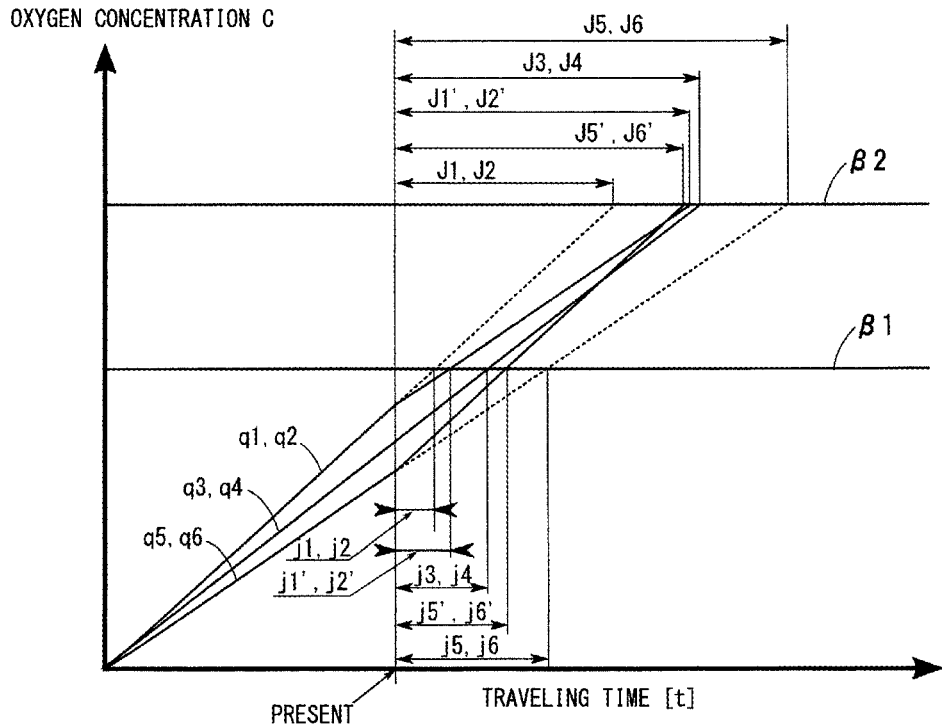
FIG. 15 is a graph showing a change of the usable periods of tires R1 to R6 when the tires are replaced on the basis of the processing in S500.

FIG. 15 is a graph showing a change in a usable period of the tires R1 to R6 when the tires set as a replacement pair are mutually replaced on the basis of the processing in S500. As shown in the same figure, when the mounted positions of the tires R1 to R6 are changed, the travelable times j1 and j2 of the tires R1 and R2 become travelable times j1' and j2', the use period of the tires can be extended more than when the present mounted positions are continued. By this replacement, travelable times j5' and j6' and the use period of the tires become shorter than the travelable times j5 and j6 of the tires R5 and R6, which are continuously mounted, but a progress of deterioration of the casings of the tires R1 to R6 mounted on the vehicle can be equalized, so that it becomes possible to extend the total life of the tires of which retreading is considered.

[S530]

Figure 16:
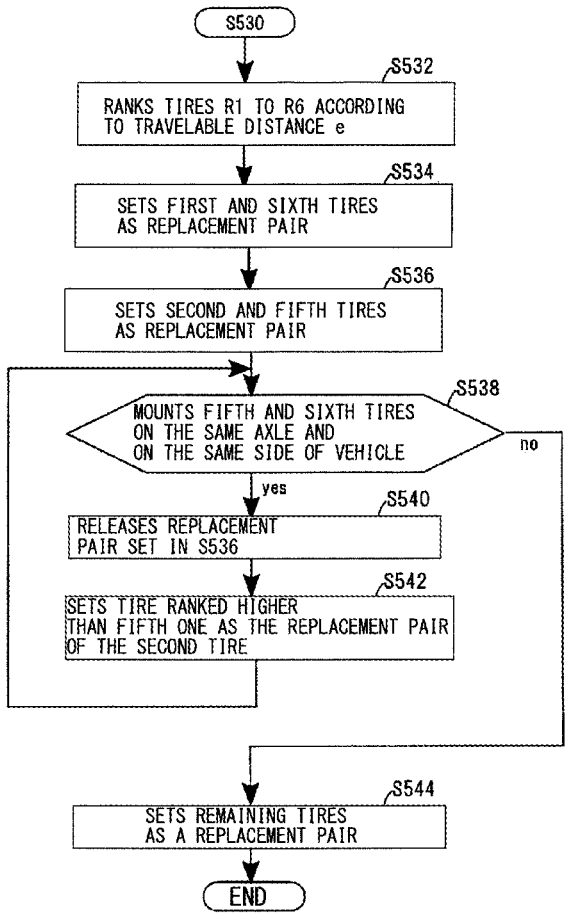
FIG. 16 is a flow chart showing processing in S530.

FIG. 16 is a flow chart showing processing in S530. S530 creates a change plan for tire mounted positions so as to make the tread rubber wear evenly when the travelable difference Δe is not smaller than the prescribed threshold x3 and the travelable time difference Δj is smaller than the prescribed threshold x4.

S532: Ranking is made according to the length of travelable distances e1 to e6 of respective tires R1 to R6. For example, ranking is made with tires having short travelable distances e1 to e6 set at a higher order. Tires mounted on the same axle of the vehicle are generally considered to deteriorate the casings evenly on right and left sides, but since the travelable times e1 to e6 are calculated by computer simulation, it can be considered that the right and left sides do not have the same value. If the travelable times are the same, for example, it may be determined as a rule that a tire with a small tire ID number is set at a higher order. And, as another method, tires with the same travelable time may be determined to be at the same order. In this step, for example, the tires R1, R2, R3, R4, R5 and R6 are ranked in the order of one to six.

S534: The first (the shortest travelable distance) tire (R1) and the sixth (the longest travelable distance) tire (R6) are set as a replacement pair that their mutual mounted positions are changed.

S536: The second (the second shortest travelable distance) tire (R2) and the fifth (the second longest travelable distance) tire (R5) are set as a replacement pair that their mutual mounted positions are changed.

S538: When it is judged that the sixth tire and the fifth tire set as a pair in S534 and S536 are mounted on the same axle and on the same right and left sides of the vehicle and the above conditions are satisfied, the processing moves to S540, but if the conditions are not satisfied, the processing moves to S544.

S540: The set of the replacement pair of the second tire and the fifth tire set in S536 is released, and the processing moves to S542. In other words, when the mounted positions of the replacement pair are on the same axle and on the same side of the vehicle, a progress of their deterioration is the same and the travelable distance does not change even when they are replaced, so that when the setting of the replacement pair is released, a trouble of replacing the tires can be reduced.

S542: A tire (a high-order tire than the tire R5) with the next longest travelable distance e to the tire (R5) which is set as the replacement pair of the second tire (R2) in S538 is set as a new replacement pair of the second tire (R2), and the process returns to S538. And, S538 to S542 are repeated so that a tire which is the replacement pair with the second tire (R2) is mounted on the same axle and not on the same right and left sides of the vehicle.

S544: The remaining tires are set as a replacement pair, and the processing is terminated.

The replacement pair set by the above processing is output as a change plan for the mounted positions to the display output means 44.

Figure 17:
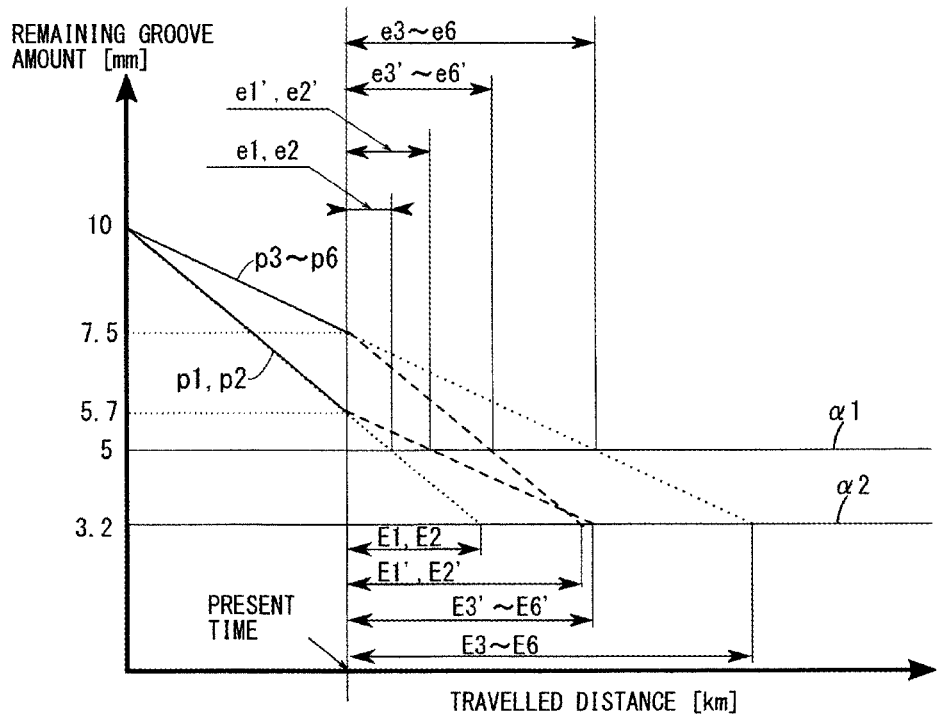
FIG. 17 is a graph showing a change of the usable periods of tires R1 to R6 when the tires are replaced by processing in S530.

FIG. 17 is a graph showing changes of usable periods of tires R1 to R6 when they are replaced by the processing in S530. As shown in the same figure, when the tires R1 to R6 are replaced, the travelable distances of the tires R1 and R2 are extended from travelable distances e1 and e2 to travelable distances e1' and e2' when they are continuously mounted at the present mounted positions. By this replacement, the tires R5 and R6 with a travelable distance longer than the tires R1 and R6 have travelable distances e5 and e6 shortened to travelable distances e5' and e6', but the tires R1 and R2 have the travelable distances e1 and e2 extended to the travelable distances e1' and e2'. As a result, as shown in FIG. 17, the travelable distances of the tires R1, R2, R5 and R6 come closer to the retread groove allowable value α1 and the groove use limit value α2, and the progress of tread rubber wear of the tires mounted on the vehicle can be made even.

[S560]

Figure 18:
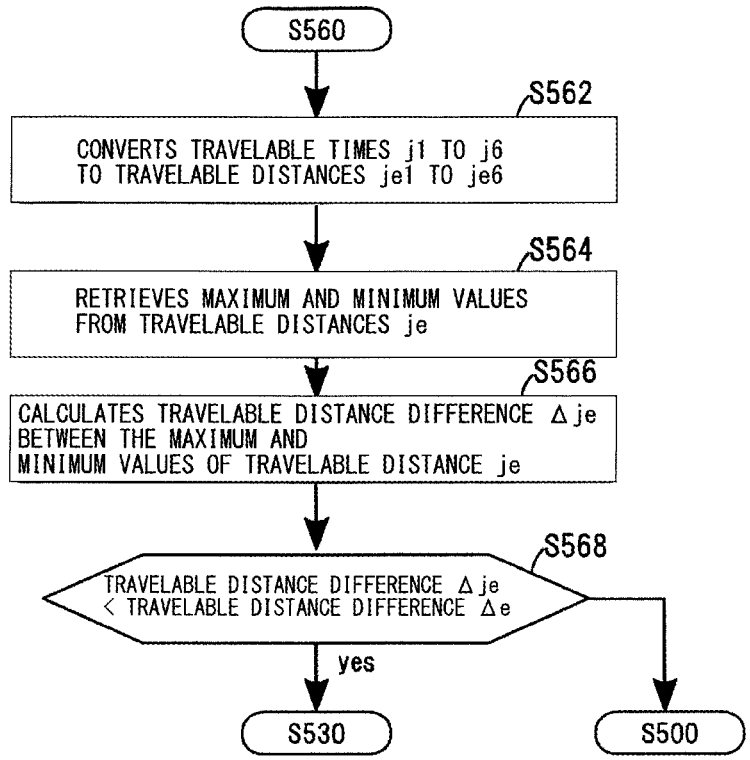
FIG. 18 is a flow chart showing processing in S560.

FIG. 18 is a flow chart showing processing in S560. In S560, when the travelable distance difference Δe is smaller than the prescribed threshold x3 and the travelable time difference Δj is not smaller than the prescribed threshold x4, a change plan for tire mounted positions is created considering a wear state of the tread rubber and a deterioration state of the casing.

S562: Travelable times j1 to j6 of the respective tires R1 to R6 are converted to travelable distances je1 to je6. This conversion can be made approximately to the travelable distances je1 to je6 by, for example, calculating the traveled distance per unit time from the tire-used time and traveled distance up to the present time, and multiplying the travelable times j1 to j6 of the respective tires R1 to R6.

S564: The maximum and minimum values are retrieved from the travelable distances je1 to je6.

S566: A difference (travelable distance difference) Δje between the maximum and minimum values of a travelable distance je retrieved in S564 is calculated.

S568: It is judged whether the travelable distance difference Δje calculated in S566 is smaller than the travelable distance difference Δe calculated in S454, and if smaller than the travelable distance difference Δe, the processing moves to S530, but if it is not smaller than the travelable distance difference Δe and not smaller than the threshold x3, the processing moves to S500.

In other words, the wear state of the tread rubber and the deterioration state of the casing are compared in S560, and a change plan for tire mounted positions is created depending on whether the wear state of the tread rubber has progressed more than the deterioration state of the casing and whether the deterioration state of the casing has progressed more than the wear state of the tread rubber.

[S600]

Figure 19:
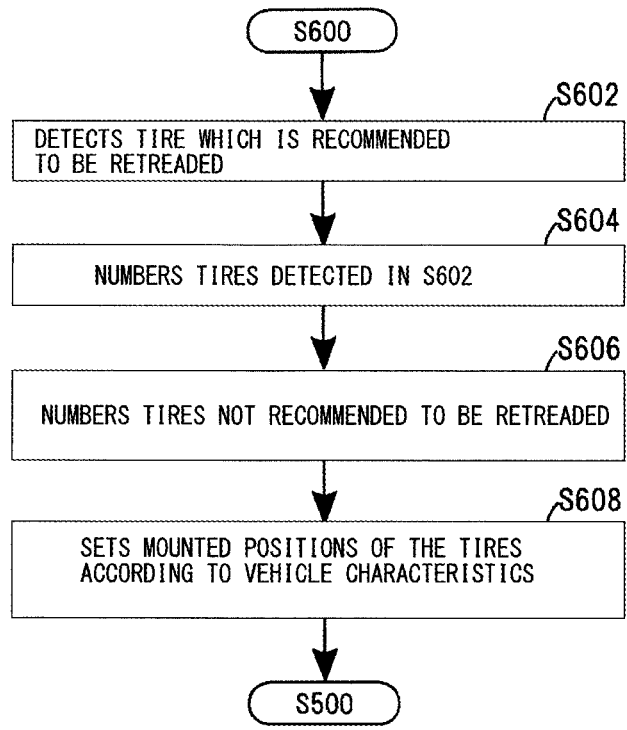
FIG. 19 is a flow chart showing processing in S600.

FIG. 19 is a flow chart showing processing in S600. S600 creates a change plan for tire mounted positions when the above-described S406 has a tire that information "retreading recommended" is set as tire information. At this time, a tire which is recommended to be retreaded is processed on the assumption that it is retreaded.

S602: A tire which is recommended to be retreaded according to the tire information is detected, and the processing moves to S604.

S604: For example, the tires detected in S602 are numbered sequentially from 1, and the processing moves to S606. For example, the tires are sequentially numbered from a smaller tire ID number.

S606: Tires, which are not recommended to be retreaded and have the travelable distance e, are numbered in order of length of the travelable distance e to have a sequence number to the number given in S604, and the processing moves to S608.

S608: On the basis of the vehicle characteristics stored in the data accumulation means 42, the tires numbered in S604 and S606 are set as mounted positions in order of the mounted positions with a fast wear tendency of the tread rubber of the vehicle, and the processing moves to S500. In other words, when the retreading-recommended tire is retreaded, after a change plan for the mounted positions is created, a change plan for the tire mounted positions when retreading was not performed is also created.

The tire mounted positions set in S608 are output as a change plan for the mounted positions to the display output means 44.

[S650]

Figure 20:
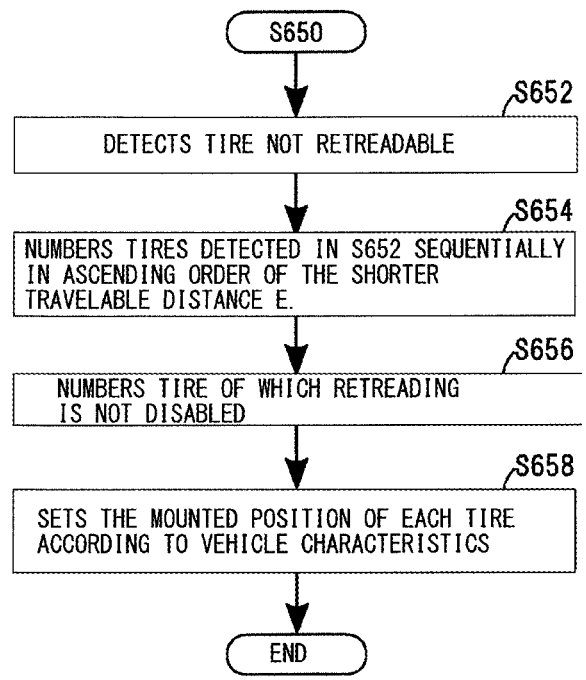
FIG. 20 is a flow chart showing processing in S650.

FIG. 20 is a flow chart showing processing in S650. S650 creates a change plan for tire mounted positions when a tire having information "No retreading" set as tire information is included in the above-described S404.

S652: A tire which is determined as not retreadable on the basis of the tire information is detected, and the processing moves to S654.

S654: For example, the tires detected in S652 are numbered in order of the shorter travelable distance E, for example, numbered from 1.

S656: Numbering is made to have a sequence number to the numbers given in S654 in a shorter order of the travelable distance e of the tire of which retreading is not disabled, and the processing moves to S658.

S658: On the basis of the vehicle characteristics stored in the data accumulation means 42, the tires numbered in S604 and S606 are set in numerical order from the mounted position with a slower wear tendency of the tread rubber of the vehicle, and the processing is terminated.

In other words, after a change plan for the mounted positions of the tires determined as "No retreading" is created, processing of creating a change plan for the mounted position of the retreadable tire is executed.

The mounted positions of tires set in S658 are output as a change plan for the mounted positions to the display output means 44.

[S700]

Figure 21:
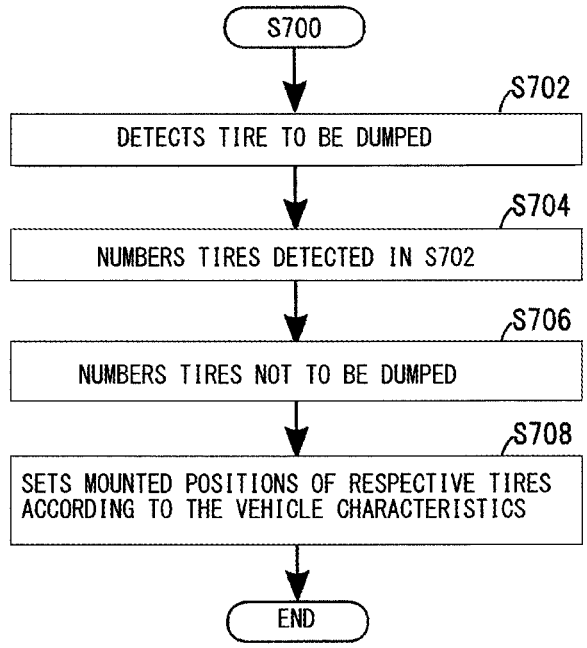
FIG. 21 is a flow chart showing processing in S700.

FIG. 21 is a flow chart showing processing in S700. S700 creates a change plan for tire mounted positions when the tire information includes a tire which is set with information "to be dumped" in the above-described S408 is included. It is processed in S700 on the assumption that a brand-new tire is mounted instead of a tire to be dumped.

S702: A tire recorded to be dumped according to the tire information is detected, and the processing moves to S704.

S704: For example, the tires detected in S702 are numbered sequentially from 1, and the processing moves to S606. For example, numbering is made sequentially from a smaller tire ID number.

S706: Numbering is made to have a sequence number to the numbers given in S704 in a longer order of the travelable distance E of the tires of which dumping schedule is not recorded, and the processing moves to S708.

S708: On the basis of the vehicle characteristics stored in the data accumulation means 42, the tires numbered in S604 and S606 in order of the mounted positions with a faster wear tendency of the tread rubber of the vehicle are set as the mounted positions in numerical order, and the processing is terminated.

The tire mounted positions set in S708 are output as a change plan for mounted positions to the display output means 44.

Figure 22:
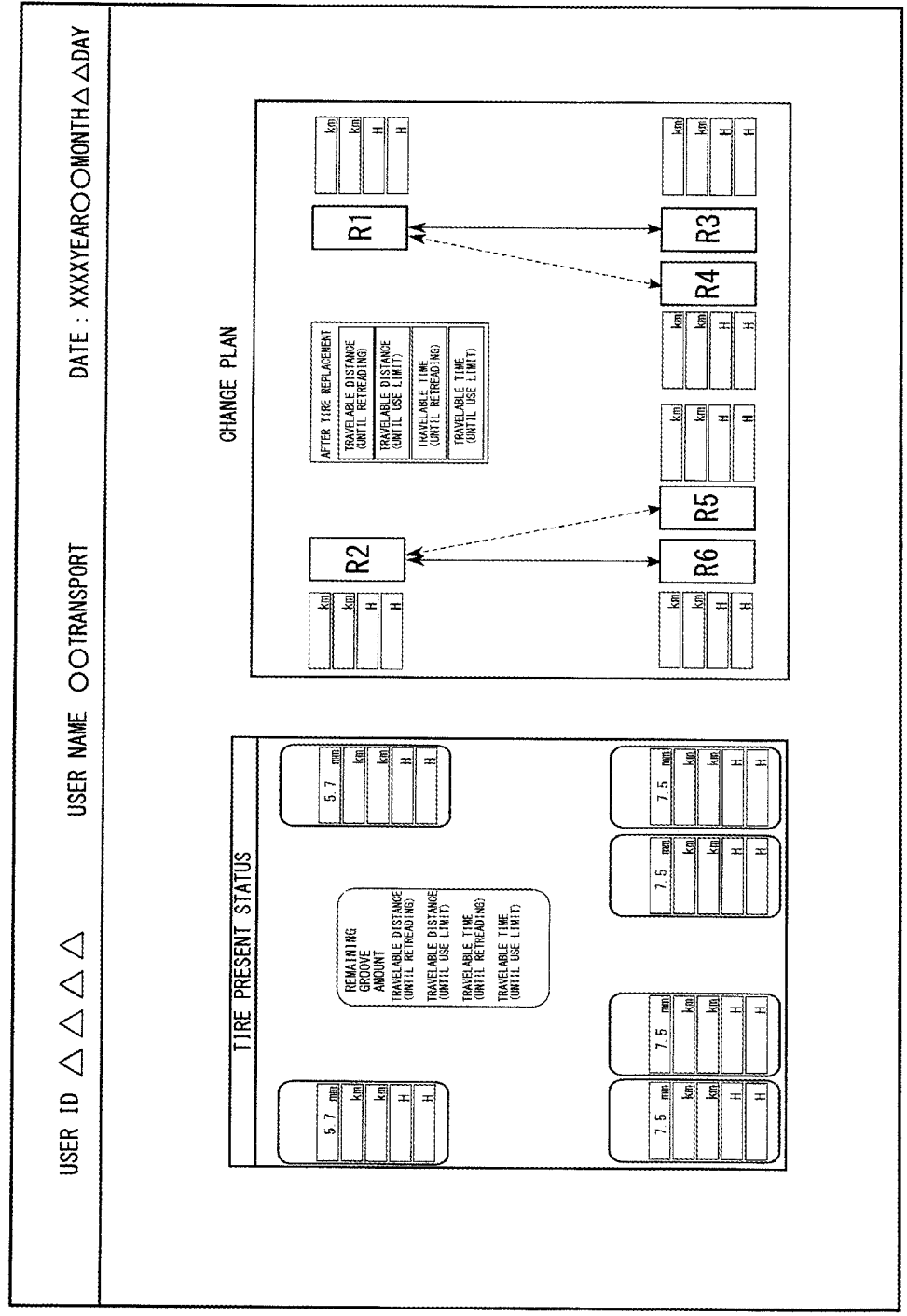
FIG. 22 is a display example at a user terminal showing tire present state information and a change plan of mounted positions.

FIG. 22 shows an example of the display screen which shows at the user terminal 4 the tire present state information and a change plan of the mounted positions to be output by the above-described respective processing. As shown in the same figure, the tire present state information and the change plan for the mounted positions are shown on the screen of the user terminal 4. As the tire present state information, for example, the present groove remaining amount, the travelable distance and travelable time until retreading, the travelable distance and travelable time until the use limit, etc. are shown.

As a change plan, there are shown a replacement view, a travelable distance and a travelable time until retreading after replacing, and a travelable distance and a travelable time until the use limit as shown in FIG. 22.

The user can change the tire mounted positions according to the details shown on the screen to make even the deterioration of tires mounted on the vehicle. As a result, it can be managed to maximize the use period of tires.

As described above, the present embodiment can manage to make even the deterioration of tires mounted on the vehicle, so that the use period of tires can be made equal. Thus, quick deterioration of a particular tire can be prevented by equalizing the tire deterioration, and the use period of all tires can be extended as a result.

It was explained in the above embodiment that deterioration of tire tread rubber and casing of one vehicle is equalized, but it is not limitative. For example, when a tire is removed from the vehicle and information on the removed tire is stored in the database 32 and the data accumulation means 42, the existence of the removed tire is linked with user information, and when a change plan for the mounted positions of tires of the vehicle is created by the mounting position planning means 40, the change plan can be created to include the removed tire. And, the specific processing of the change plan for the mounted positions by the mounting position change means 40 in the above description is one example, and it can be changed appropriately.

The above embodiment was on the assumption that all tires are those which can be retreaded, but when all tires are those which cannot be retreaded or those which include tires which cannot be retreaded, the deterioration state can be predicted to make management. That is, each processing may be performed with the processing of the part related to retreading omitted from the above description.

And, in the above embodiment, it is determined that the casing deterioration tendency calculation means 48 in the deterioration state prediction means 36 predicts a deterioration tendency of the casing on the basis of the oxygen concentration history considering a temperature of the tire but it is not limitative. For example, in accordance with a use region (such as a cold region, a highland, or a polar region) of the management target tires, a deterioration tendency of the casing can be predicted as follows. In the above embodiment, when the deterioration tendency of the casing is predicted by the casing deterioration tendency calculation means 48, only the oxygen concentration C in the casing is considered without considering the tire temperature T, and a deterioration tendency line is calculated on the basis of the calculated oxygen concentration history, and it can also be used. And, in prediction of the deterioration tendency of the casing by the casing deterioration tendency calculation means 48 in the above-described embodiment, only the casing temperature T is considered without considering the oxygen concentration C in the tire, the deterioration tendency line is calculated on the basis of the calculated temperature history, and it can also be used.

The above-described embodiment was also explained that for example, the server 3 predicts the wear tendency of the tread rubber and the deterioration tendency of the casing by the deterioration state prediction means 36 every time the load information and the tire inspection information are input from the user terminal 4, but it may be configured that, for example, every time the input traveled distance reaches a prescribed distance, prediction is made when there is an inquiry from the user.

And, the deterioration state prediction means 36 was explained in the above-described embodiment that it predicts a deterioration state of the tire R on the basis of the tire model M or the road surface model N, but in addition, a rim model having the tire R assembled on a rim and an air chamber model which is obtained by modeling a space surrounded by the rim and the tire R assembled on the rim may be formed to calculate a temperature distribution of the tire R and an oxygen concentration distribution.

A configuration of the tire management device according to an embodiment of the present invention comprises a deterioration state prediction means which predicts a deterioration tendency and a deteriorated state of tires mounted on a vehicle for each mounting position; a usable period prediction means which predicts, on the basis of the deterioration tendency and the deteriorated state predicted by the deterioration state prediction means, a tire usable period for each mounting position; and a mounting position planning means which creates a change plan for tire mounted positions of the vehicle so as to equalize the use period of each tire by determining the deterioration tendency of each tire predicted by the deterioration state prediction means as a mounting position deterioration characteristic of each tire mounted position of the vehicle and on the basis of the mounting position deterioration characteristics and the usable period of each tire predicted by the usable period prediction means.

According to this configuration, tires can be managed to make even the use period of tires mounted on a vehicle. That is, management can be made to prevent that the deterioration of only a particular tire is progressed.

As another configuration of the tire management device, the deterioration state prediction means can grasp the deterioration state of each tire with high accuracy by separately predicting the deterioration tendency and deterioration state of the tread rubber and casing of each tire.

As another configuration of the tire management device, the usable period prediction means can grasp a remaining life as the tire with high accuracy by separately predicting a usable period of the tread rubber and casing of each tire.

As another configuration of the tire management device, the mounting position planning means can manage tires with higher accuracy by creating a change plan for tire mounted positions on the basis of a shorter usable period between the usable periods of the tread rubber and casing of each tire predicted by the usable period prediction means.

As another configuration of the tire management device, the display output means for displaying a change plan for tire mounted positions created by the mounting position planning means is further provided, so that the mounted positions can be visually confirmed.

And, a program may be configured to cause a computer function as the above-described respective means.

DESCRIPTION OF REFERENCE NUMERALS

1: Tire management device
2: Tire use state acquisition means
3: Server
4: User terminal
36: Deterioration state prediction means
38: Usable period prediction means
40: Mounting position planning means

The invention claimed is:

1. A tire management device, comprising:
a deterioration state prediction means which predicts a deterioration tendency and a deteriorated state of tires mounted on a vehicle for each mounting position;
a usable period prediction means which predicts a tire usable period for each mounting position of tires on the basis of a deterioration tendency and a deterioration state predicted by the deterioration state prediction means; and
a mounting position planning means which, sets the deterioration tendency of each tire predicted by the deterioration state prediction means as a mounting position deterioration characteristic of each mounting position of a tire in the vehicle, creates, on the basis of the mounting position deterioration characteristic and the usable period of each tire predicted by the usable period prediction means, a change plan for tire mounted positions of the vehicle in order to equalize the use period of each tire.

2. The tire management device according to claim 1, wherein the deterioration state prediction means separately predicts a deterioration tendency and a deterioration state of the tread rubber and casing of each tire.

3. The tire management device according to claim 2, wherein the usable period prediction means separately predicts a usable period of the tread rubber and casing of each tire.

4. The tire management device according to claim 3, wherein the mounting position planning means creates a change plan for tire mounted positions based on a shorter usable period between the usable periods of tread rubber and casing of each tire predicted by the usable period prediction means.

5. The tire management device according to claim 1, further comprising a display output means for displaying a change plan for tire mounted positions created by the mounting position planning means.

6. A tire management program for causing a computer function as:
a deterioration state prediction means which predicts a deterioration tendency and a deteriorated state of tires mounted on a vehicle for each mounting position;
a usable period prediction means which predicts a tire usable period for each mounting position of tires on the basis of a deterioration tendency and a deterioration state predicted by the deterioration state prediction means; and
a mounting position planning means which, sets the deterioration tendency of each tire predicted by the deterioration state prediction means as a mounting position deterioration characteristic of each mounting position of a tire in the vehicle, creates, on the basis of the mounting position deterioration characteristic and the usable period of each tire predicted by the usable period prediction means, a change plan for tire mounted positions of the vehicle in order to equalize the use period of each tire.

* * * * *